United States Patent
Baldi et al.

(10) Patent No.: US 10,263,868 B1
(45) Date of Patent: Apr. 16, 2019

(54) USER-SPECIFIC POLICY ENFORCEMENT BASED ON NETWORK TRAFFIC FINGERPRINTING

(71) Applicant: Narus, Inc., Sunnyvale, CA (US)

(72) Inventors: Mario Baldi, Cuneo (IT); Yong Liao, Sunnyvale, CA (US); Stanislav Miskovic, San Jose, CA (US); Antonio Nucci, San Jose, CA (US); Han Hee Song, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 513 days.

(21) Appl. No.: 14/334,141

(22) Filed: Jul. 17, 2014

Related U.S. Application Data

(63) Continuation-in-part of application No. 13/444,525, filed on Apr. 11, 2012, now Pat. No. 8,862,726.

(51) Int. Cl.
*H04L 12/26* (2006.01)

(52) U.S. Cl.
CPC ................... *H04L 43/0876* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 8,312,056 B1 * | 11/2012 | Peng | ...................... | G06Q 50/01 705/319 |
| 2004/0257994 A1 * | 12/2004 | Paskett | ............... | H04L 12/5695 370/230 |
| 2006/0218575 A1 * | 9/2006 | Blair | ...................... | H04L 63/10 725/28 |
| 2010/0100618 A1 * | 4/2010 | Kuhlke | ............... | H04L 12/2602 709/224 |
| 2012/0123870 A1 * | 5/2012 | Denman | ............ | G06Q 30/0241 705/14.66 |
| 2013/0102283 A1 * | 4/2013 | Lau | ...................... | H04W 12/06 455/411 |

* cited by examiner

*Primary Examiner* — Aaron N Strange
*Assistant Examiner* — Mohammad Yousuf A. Mian
(74) *Attorney, Agent, or Firm* — Kwan & Olynick LLP

(57) ABSTRACT

A method for applying a user-specific policy in a network. The method includes identifying a historical portion of network traffic of the network as associated with a user, analyzing, by a computer processor, the historical portion of network traffic to generate a fingerprint of the user, wherein the fingerprint represents characteristics of user activity in the network, identifying, by the computer processor, an ongoing portion of network traffic of the network as associated with the user, analyzing, by the computer processor and based on the fingerprint, the ongoing portion of network traffic to determine a match, wherein the match is determined at a time point within the ongoing portion of network traffic, and applying, in response to determining the match, the user-specific policy to the ongoing portion of network traffic subsequent to the time point.

20 Claims, 7 Drawing Sheets

USER-SPECIFIC POLICY ENFORCEMENT BASED ON NETWORK TRAFFIC FINGERPRINTING

CROSS REFERENCE TO RELATED APPLICATIONS

This application is a continuation-in-part application of U.S. Non-provisional patent application Ser. No. 13/444,525 filed Apr. 11, 2012.

BACKGROUND OF THE INVENTION

Field of the Invention

The present invention relates to computers and computer networks. More particularly, the invention relates to analyzing user activities in a network to apply user-specific policies.

Background of the Related Art

In today's Internet, users leak various types of information. For example, users leak their online social networks (OSN) identities. In another example, cookies sent to user browsers contain unique user tags, etc. For a growing number of users, online social networking (OSN) sites have become an integral part of their online activities. These OSN sites often function as the portal and launching points from where users receive news updates, venture over to other sites, and so forth. In addition, many websites now also have ties-in with various OSN sites, e.g., enticing users to recommend or comment on news items, web posts, etc. via a simple click of buttons. With wide adoption of modern GPS-equipped touch-sensitive smartphones and emergence of various mobile applications and services (e.g., location-based services), information access is nearly ubiquitous and literally at the fingertip. Finally, many people are very active on the Internet constantly engaging in various on-line activities ranging from browsing, reading and sending e-mails, searching. In such activities users provide a glimpse of themselves, which can be a set of unique fingerprints capable of identifying them.

SUMMARY

This disclosure presents a method and system that enforce user-specific (network usage) policies to Internet users by isolating unique features that identify each user, referred to as user fingerprints, from network traffic. Different from existing methods, the disclosed method and system do not require pre-existing knowledge of user identifiers. This method autonomously learns user identifiers by building user fingerprints from a portion of the traffic that is known to be associated to a user and referred to as training data. Although the disclosed method and system require some pre-existing knowledge of the identity of the user generating a portion of the traffic in the training data, (which is used to bootstrap continuous building and refinement of user fingerprints), the disclosed method and system enable an analyst user to identify a much larger portion of traffic belonging to each user than the amount of traffic in the training data where the fingerprints are extracted.

Policies applied on the user traffic may vary depend on the specific application and the network node in which the disclosed method and system are being deployed. In the case of an access node the user device is directly connected to, the policy may include providing or denying the user's access to the network, i.e., enabling or disabling the traffic to and from the user device. In the case of a router providing connectivity between a private (e.g., corporate or home) network and the public Internet, policies may allow devices used by different users to receive/send traffic from/to specific services. For example, in a household scenario, devices whose fingerprints belonging to children are not allowed to access adult rated content on the Internet.

The key advantage of the disclosed method and system over traditional per-user policy enforcement solution includes continually re-identifying the user as opposed to trusting the user's identity obtained at any single time instance, such as a user-login to a service or device. Traditional information systems (e.g., Windows®, Facebook®, etc.) identify the user via one-time authentication occurring when the user logs in. Subsequently, the traditional information systems identify the user based on the device, with the assumption that the device continues to be used by the same user who had last authenticated from the device. However, it may easily happen that a user hands the device to some other person and from that moment onwards the traditional information systems would not correctly identify the actual user. In contrast, the disclosed method and system continually extract user fingerprints and is able to detect that the actual user has changed. Similarly, in a traditional per-user policy enforcement system, when user A authenticates, the per-user policy enforcement system starts applying user A's policies on all the traffic generated by the device through which user A authenticated. If at some time point user B starts using the device through which user A had authenticated, the traditional per-user policy enforcement system will continue applying user A's policies to the traffic generated by user B. The disclosed method and system find user B's fingerprint in the traffic and immediately switches to applying user B's policies.

In one or more embodiments of the invention, the disclosed method and system are divided in (a) a learning stage, in which an increasing number of user features is identified for fingerprinting, and (b) a traffic classification stage, in which the fingerprints are applied to identifying an increasing number of users, their activities and their traffic, and (c) a policy application stage in which per-user pre-configured policies are applied to the traffic associated to the corresponding user. Each of the stage (a) and stage (b) consists of specialized functions: (i) block delineation, identifying traffic blocks that likely belong to specific users, (ii) block correlation, identifying users which generated sets of blocks, (iii) block analysis, discovering users' on-line activities and traffic markers which subsequently become user features, and (iv) user fingerprinting, combining learned features in user fingerprints. Stage (b) also includes a function for (v) applying the fingerprints to classify network traffic. Stage (c) includes a function that (vi) retrieves the policies related to the user identified by function (v) and a function (vii) to apply such policies. Policy application may be done on two different bases:

(vii.a) on a per block basis, i.e., the policy is applied to those blocks that are associated to a given user (vii.b) on a per device basis, i.e., once a particular block is associated to a user, the user's policies are applied to all traffic coming from the source address (e.g., IP address) originating the traffic in the particular block.

While the latter (vii.b) ensures that the policy is applied to the largest fraction of traffic, (vii.b) lacks precision when the same source address is being deployed by several devices used by different users. This is the case, for example, when the user device is deployed downstream of a NAT (network address translation) device.

The problem of understanding the content on the Web is referred to as Web Content Cartography. In this context, embodiments of the invention provides a novel passive traffic monitoring system that helps in understanding the mapping between users, content owners, and the hosts serving the content. It leverages the public information available in the network (e.g., DNS queries and responses, service provider specific information mined from traffic payloads, other public user information from web crawls, etc.), correlates them to the actual data flows to not only reveal the aforementioned mapping, but also shed light on several other problems like port-service mapping, automatic service label extraction, and pure flow-set generation, etc. Generally, these issues have been addressed using manual approaches.

In general, in one aspect, the present invention relates to a method for applying a user-specific policy in a network. The method includes identifying a historical portion of network traffic of the network as associated with a user, analyzing, by a computer processor, the historical portion of network traffic to generate a fingerprint of the user, wherein the fingerprint represents characteristics of user activity in the network, identifying, by the computer processor, an ongoing portion of network traffic of the network as associated with the user, analyzing, by the computer processor and based on the fingerprint, the ongoing portion of network traffic to determine a match, wherein the match is determined at a time point within the ongoing portion of network traffic, and applying, in response to determining the match, the user-specific policy to the ongoing portion of network traffic subsequent to the time point.

In general, in one aspect, the present invention relates to a system for applying a user-specific policy in a network. The system includes a processor and memory, a user flow group generator comprising instructions stored in the memory, when executed on the processor having functionality to identify a historical portion and an ongoing portion of network traffic of the network as associated with a user, a user activity analyzer comprising instructions stored in the memory, when executed on the processor having functionality to analyze the historical portion of network traffic to generate a fingerprint of the user, wherein the fingerprint represents characteristics of user activity in the network, and analyze, based on the fingerprint, the ongoing portion of network traffic to determine a match, wherein the match is determined at a time point within the ongoing portion of network traffic, and a network traffic manager comprising instructions stored in the memory, when executed on the processor having functionality to apply, in response to determining the match, the user-specific policy to the ongoing portion of network traffic subsequent to the time point.

In general, in one aspect, the present invention relates to a non-transitory computer readable medium embodying instructions for applying a user-specific policy in a network. The instructions when executed by a processor include functionality for identifying a historical portion of network traffic of the network as associated with a user, analyzing the historical portion of network traffic to generate a fingerprint of the user, wherein the fingerprint represents characteristics of user activity in the network, identifying an ongoing portion of network traffic of the network as associated with the user, analyzing, based on the fingerprint, the ongoing portion of network traffic to determine a match, wherein the match is determined at a time point within the ongoing portion of network traffic, and applying, in response to determining the match, the user-specific policy to the ongoing portion of network traffic subsequent to the time point.

Other aspects and advantages of the invention will be apparent from the following description and the appended claims.

DETAILED DESCRIPTION

Figure 1A:
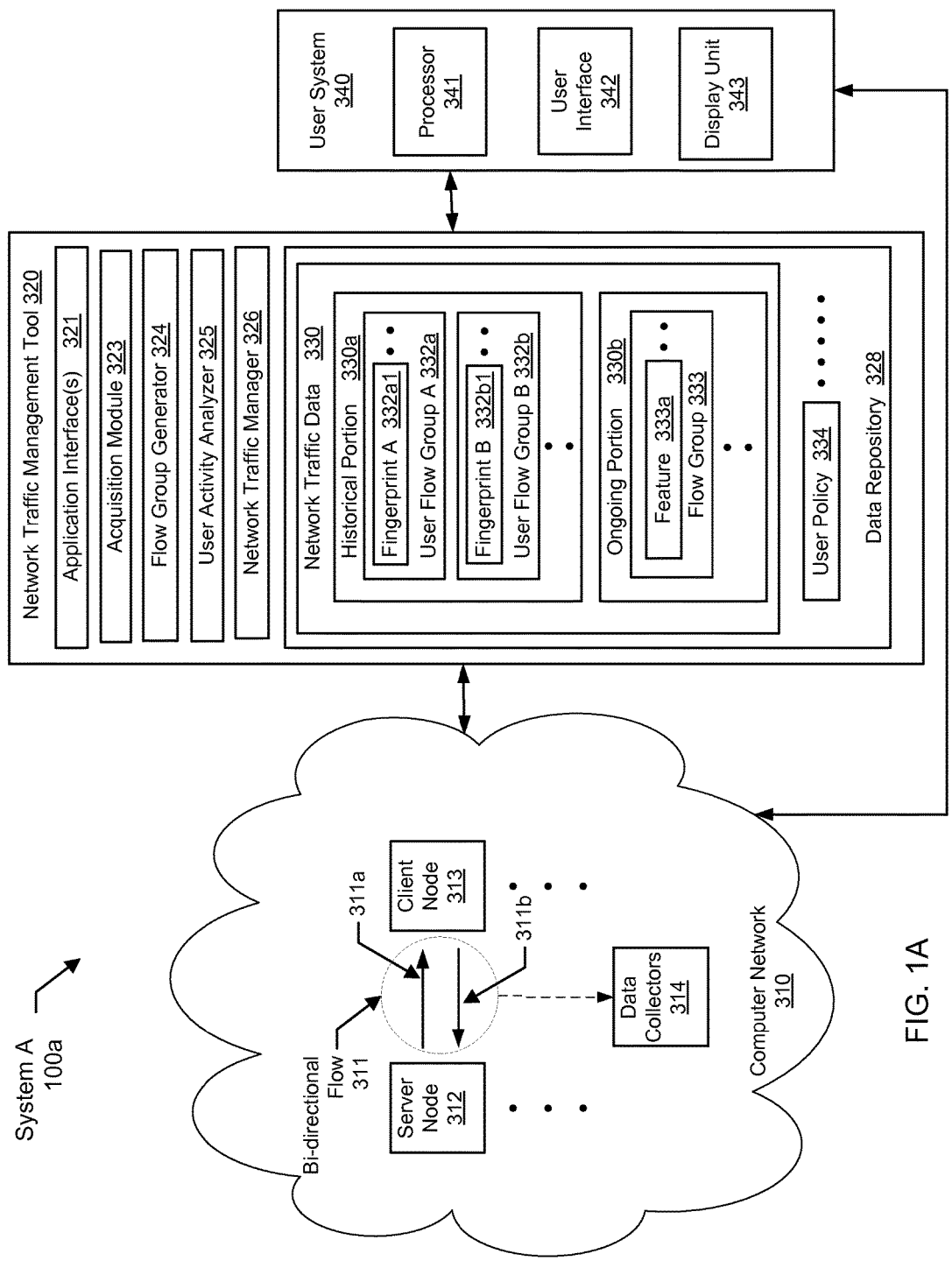
FIG. 1A shows a schematic block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (e.g., a TCP flow) between two network hosts (e.g., a client and a server in a client-server application scenario) is a series of data records (referred to as packets or data packets, e.g., IP packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow and sequence information identifying a logical position of the packet in the flow. Said in other words, a flow consists of one or more packets having the same 5-tuple identifier, aggregate based on sequence information contained in the headers of the packets, and transmitted within a defined time window. Typically, a user command to execute an application initiates a flow from an application client (i.e., source address=client IP) to an application server (i.e., destination address=server IP), which is preceded by DNS flows (i.e., DNS query and DNS response) between the client IP and a DNS server to identify the server IP based on a domain name contained in the user command Termination (or completion) of the flow may be marked by a TCP packet flag (e.g., "connection reset" or "fin") or if a time-out condition occurs when no more packet having the 5-tuple identifier is transmitted in the sequence beyond a pre-determined time-out period since the last transmitted packet in the flow. This time-out period may be heuristically determined by the application and is generally set at 2 min.

Throughout this disclosure, the terms "traffic flow," "data flow," "flow," "traffic stream," and "stream" are used interchangeably and may refer to a uni-directional flow, a bi-directional flow, a complete flow or any portion thereof unless explicitly stated otherwise. For example, a bi-directional flow may include a client-to-server uni-directional flow and a server-to-client uni-directional flow that are identifiable based on the flow header information. Further, the term "transport protocol" refers to a protocol associated with or based on top of a transport layer of a computer network. For example, the transport protocol may be referred to as layer-four (L4) protocol with respect to the OSI model (i.e., Open Systems Interconnection Reference Model of the network architecture). Examples of layer-four protocols include TCP, UDP, etc.

Further, the terms "user computing device," "mobile device," "device" "smartphone," "tablet computer," "notebook computer" are used interchangeably depending on the context.

Further still, the term "application" or "network application" refers to an application associated with or based on top of an application layer of a computer network. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent® (a registered trademark of BitTorrent, Inc., San Francisco Calif.), GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy.

Generally, many OSN sites incorporate the user OSN identifiers in the HTTP headers (e.g., cookies) either for user authentication or for tracking user inside the OSN without requiring repeated sign-ins. Embodiments of the invention use extracted OSN identifiers to identify and associate network traffic generated by other online activities of each OSN user. While dynamic IP assignment by the mobile network service providers scatters a user's mobile traffic to multiple IP addresses over time, the same IP address stays with the same mobile device for a (short) period (e.g., a few seconds) until the device becomes idle. Leveraging this feature of mobile data networks, traffic flows on each IP address are segmented into blocks of generally short durations and associated/attributed to individual OSN users. Generally, cookies and related HTTP header fields are used by web services to keep track of users and devices. In one or more embodiments, relevant cookies and related HTTP header fields that may persistently or uniquely associate certain web activities to specific OSN users are automatically filtered and extracted, which are collectively referred to as traffic markers.

Once traffic blocks are extracted and attributed to individual OSN users, respective user information of various kinds may then be obtained using data mining techniques. For example, user activity analysis may be conducted based on the DNS names associated with various services/sites they visit to classify and analyze users' distinct activity fingerprints representing users' habitual online activities.

The disclosure presents a method and system that start from a small subset of traffic features to enable an analyst user to learn fingerprints of large user populations as well as use these fingerprints to identify more user traffic and activities.

The disclosed method and system start with elementary units of communication activity. In a possible embodiment, such units may be flows of packets, where a flow is here (and commonly) defined as a set of packets that belong to the same communication. For example, in networks based on the TCP/IP protocol suite, such as the Internet, the packets belonging to the same flow may be identified as having the same source IP address, destination IP address, transport layer protocol (e.g., TCP or UDP), source port and destination port.

The disclosed method and system operate under a starting assumption that elementary units of communication belonging to an individual user may originate from or terminate to the same device. In a communication network technology there is a way to uniquely identify devices that originate and terminate the traffic. Hence elementary units of communication that identify the same device as their origin or termination device are grouped into a block. Such operation is referred to as block delineation. For example, in an IP network the disclosed method and system first coarsely divide traffic into blocks or groups where flows in a given block share the same source IP addresses.

Block delineation is made more challenging from the fact that an identifier assigned to a user device may be on a temporary basis and re-assigned to another device. For example, in IP networks it is common to automatically and dynamically assign an IP address to a device when it becomes operational on a network. Common protocols deployed to perform this operation, i.e., to let a device know which IP address it should use, include DHCP (Dynamic Host Configuration Protocol), RADIUS (Remote Authentication Dial In User Service), PPP IPCP (IP Control Protocol deployed together with the Point-to-Point Protocol), etc. Once a device is no longer operational (i.e., once it is disconnected from the network or powered off), the IP address may be offered to another device for usage in tagging its traffic. For this reason the IP address is said to be leased to an end device; IP address leases come with an expiration term. As a consequence, while IP addresses uniquely identify a device for a certain amount of time, most likely they do not identify the same device in a permanent way. Therefore, to prevent accumulating traffic from multiple sources in single blocks, techniques that properly terminate, or delineate, blocks before IP address leases expire are deployed. Some example of block delineation techniques are described later in this disclosure.

Information found in these blocks is the basis of the user fingerprints. Each block may contain information that provides more insight in user identity and activity. For example, the blocks may contain email address, home address, cell phone numbers, user names for various web services, identification tags of user devices such as UDIDs (Unique Device Identifiers) or MAC (Media Access Control) addresses or IMEIs (International Mobile Station Equipment Identities). Moreover, a user may be identified by hostnames of accessed services, by patterns of visited geo-locations and businesses, etc.

Moreover, information found in each block is processed with the goal of making sure that the traffic grouped in the block, and consequently the information extracted from it, really belong to a single user. In other words, from time to time, the information gathered within a block may actually belong to more than one user. The disclosed method and system address this issue using several options: (i) discarding the information found in the block as it cannot be uniquely associated to the user generating it, or (ii) separating information belonging to different users.

Another problem is that traffic of each individual user is usually distributed in blocks collected at different times and thus from different source IP addresses. The disclosed method and system include (i) user identifier (ID) correlation techniques to determine that multiple user IDs belong to the same user, and (ii) block correlation techniques to determine that multiple blocks belong to the same user.

Joining a number of blocks results in a much larger body of traffic, containing a larger amount of user information and activity that may be considered in identifying features to fingerprint users. The disclosed method and system include several techniques for information and activity extraction to generate user fingerprints. The fingerprints are established based on persistence, uniqueness, and entropy criteria that sufficiently distinguish individual users from general populations.

The disclosed method and system continuously evaluate the quality of fingerprints, i.e., their capability to successfully identify individual users. In this continuous process, candidate fingerprints (not used in user identification and traffic attribution) are promoted to active fingerprints (deployed to attribute traffic to users). Similarly, some of the active fingerprints are demoted to candidate fingerprints or being discarded.

Once the fingerprints are available, the fingerprints may be applied to traffic captured in a different part of the network. For example, in one of the embodiments, the fingerprints may be obtained from traffic logs of one cellular phone operator, and applied to traffic of any other cellular phone operator, ISP, enterprise, etc.

FIG. 1A shows a system block diagram of a system A (100a) in accordance with one or more embodiments of the invention. Those skilled in the art, having the benefit of this detailed description, will appreciate the components shown in FIG. 1A may differ among embodiments of the invention, and that one or more of the components may be optional. Although specific numbers of components are shown in FIG. 1, different number of each component may be included. In one or more embodiments of the invention, one or more of the components shown in FIG. 1A may be omitted, repeated, supplemented, and/or otherwise modified from that shown in FIG. 1A. Accordingly, the specific arrangement of components shown in FIG. 1A should not be construed as limiting the scope of the invention.

As shown in FIG. 1A, the system A (100a) includes a network traffic management tool (320), a user system (340), and a computer network (310). The network traffic management tool (320) includes a data repository (328), one or more application interfaces (321), an acquisition module (323), a flow group generator (324), a user activity analyzer (325), and a network traffic manager (326). The user system (340) includes a processor (341), a user interface (342), and a display unit (343). The computer network (310) may include wired and/or wireless portions of the Internet and/or other data communications networks such as wide area networks (WANs), local area networks (LANs), etc. Further, the computer network (310) includes network nodes (e.g., server node (312), client node (313), data collectors (314), etc.), which are devices configured with computing and communication capabilities for executing applications in the network (310).

As shown in FIG. 1A, the server node (312) and client node (313) communicate with each other by exchanging data packets forming a bi-directional flow (311), which includes two uni-directional flows (311a) and (311b) represented by two arrows. In one or more embodiments, the server node (312) and the client node (313) exchange data packets in the bi-directional flow (311) as a result of a network application executing on the server node (312) and the client node (313). In this context, the bi-directional flow (311) is referred to as being generated by the network application executing on the server node (312) and client node (313). For example, the source IP address in the 5-tuple of the uni-directional flow (311a) and the destination IP address in the 5-tuple of the unit-direction flow (311b) are both the IP address of the server node (312), referred to as the server IP address. The destination IP address in the 5-tuple of the uni-directional flow (311a) and the source IP address in the 5-tuple of the unit-direction flow (311b) are both the IP address of the client node (313), referred to as the client IP address. The source port in the 5-tuple of the uni-directional flow (311a) and the destination port in the 5-tuple of the unit-direction flow (311b) are both the port of the server node (312), referred to as the server port. The destination port in the 5-tuple of the uni-directional flow (311a) and the port in the 5-tuple of the unit-direction flow (311b) are both the port of the client node (313), referred to as the client port. Further, the server port and the transport protocol in both 5-tuples are characteristics of the application executing on the server node (312) and the client node (313). In one or more embodiments, the client portion of the network application is downloaded from the network application distribution platform (150) and installed on the client node (313). In one or more embodiments, the network application is a mobile app where the client portion of the application is downloaded from a network application distribution platform and installed on a mobile device (i.e., client node (313), such as iPhone®, Android® phone, Windows Phone®, etc.).

In one or more embodiments, certain device(s) (e.g., data collectors (314)) within the computer network (310) may be configured to collect network data (e.g., bi-directional flow (311)) for providing to the network traffic management tool (320). Each of these components is described below. One of ordinary skill in the art will appreciate that embodiments are not limited to the configuration shown in FIG. 1A.

In one or more embodiments of the invention, the network traffic management tool (320) is configured to interact with the computer network (310) using one or more of the application interface(s) (321). The application interface (321) may be configured to receive data (e.g., bi-directional flow (311)) from the computer network (310) and/or store received data to the data repository (328). Such network data captured over a time period (e.g., an hour, a day, a week, etc.) is referred to as trace or network trace. Network trace contains network traffic data related to communications between nodes in the computer network (310). For example, the network trace may be captured on a routine basis using the data collectors (314) and selectively sent to the application interface (321) from time to time to be formatted and stored in the repository (327) for analysis. For example, the data collectors (314) may be a packet analyzer, network analyze, protocol analyzer, sniffer, netflow device, semantic traffic analyzer (STA), or other types of data collection devices that intercept and log data traffic passing over the computer network (310) or a portion thereof. In one or more embodiments, the data traffic log may include an extract of information found in traffic. For example, the data traffic log may include metadata or protocol information extracted from the packets. In a possible embodiment, packets are assembled in flows and/or application level sessions and higher level protocol information and payload is extracted and included in the data traffic log. In a possible embodiment, such extracted information is organized as a vector, where each extracted piece of data is one vector element. In one or more embodiments, the data collectors (314) may be deployed in the computer network (310) by a network communication service provider (e.g., ISP), a network security service provider, or other business or government entities. The data collector (314) may be configured to capture and provide network trace to the application interface (321) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (310) or activated manually through the user system (340). In one or more embodiments, the data collectors (314) are configured and/or activated by the network traffic management tool (320).

In one or more embodiments, the user system (340) is configured to interact with an analyst user using the user interface (342). The user interface (342) may be configured to receive data and/or instruction(s) from the analyst user. The user interface (342) may also be configured to deliver information (e.g., a report or an alert) to the analyst user. In addition, the user interface (342) may be configured to send data and/or instruction(s) to, and receive data and/or information from, the network traffic management tool (320). The analyst user may include, but is not limited to, an individual, a group, an organization, or some other entity having authority and/or responsibility to access the network traffic management tool (320). Specifically, the context of the term "analyst user" here is distinct from that of a user of the computer network (310), the client node (313), and or the network application executing on the client node (313). The user system (340) may be, or may contain a form of, an internet-based communication device that is capable of communicating with the application interface (321) of the network traffic management tool (320). Alternatively, the network traffic management tool (320) may be part of the user system (340). The user system (340) may correspond to, but is not limited to, a workstation, a desktop computer, a laptop computer, or other user computing device.

In one or more embodiments, the processor (i.e., central processing unit (CPU)) (341) of the user system (340) is configured to execute instructions to operate the components of the user system (340) (e.g., the user interface (342) and the display unit (343)).

In one or more embodiments, the user system (340) may include a display unit (343). The display unit (343) may be a two dimensional (2D) or a three dimensional (3D) display configured to display information regarding the computer network (e.g., browsing the network traffic data) or to display intermediate and/or final results of the network traffic management tool (320) (e.g., report, alert, etc.).

As shown, communication links are provided between the network traffic management tool (320), the computer network (310), and the user system (340). A variety of links may be provided to facilitate the flow of data through the system A (100a). For example, the communication links may provide for continuous, intermittent, one-way, two-way, and/or selective communication throughout the system A (100a). The communication links may be of any type, including but not limited to wired and wireless. In one or more embodiments, the network traffic management tool (320), the user system (340), and the communication links may be part of the computer network (310).

In one or more embodiments, a central processing unit (CPU, not shown) of the network traffic management tool (320) is configured to execute instructions to operate the components of the network traffic management tool (320). In one or more embodiments, the memory (not shown) of the network traffic management tool (320) is configured to store software instructions for performing the functionality of the network traffic management tool (320). The memory may be one of a variety of memory devices, including but not limited to random access memory (RAM), read-only memory (ROM), cache memory, and flash memory. The memory may be further configured to serve as back-up storage for information stored in the data repository (328).

The network traffic management tool (320) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic management tool (320) is configured to obtain and store data in the data repository (328). In one or more embodiments, the data repository (328) is a persistent storage device (or set of devices) and is configured to receive data from the computer network (310) using the application interface (321). The data repository (328) is also configured to deliver working data to, and receive working data from, the acquisition module (323), flow group generator (324), user activity analyzer (325), and network traffic manager (326). The data repository (328) may be a data store (e.g., a database, a file system, one or more data structures configured in a memory, some other medium for storing data, or any suitable combination thereof), which may include information related to the network traffic classification. Such information may include network traffic data (e.g., network traffic data (330)) captured from the computer network (310) and per-user policies (e.g., user policy (334)) for managing user network usage. The data repository (328) may be a device internal to the network traffic management tool (320). Alternatively, the data repository (328) may be an external storage device operatively connected to the network traffic management tool (320).

In one or more embodiments, the network traffic management tool (320) is configured to interact with the user system (340) using the application interface (321). The application interface (321) may be configured to receive data and/or instruction(s) from the user system (340). The application interface (321) may also be configured to deliver information and/or instruction(s) to the user system (340). In one or more embodiments, the network traffic management tool (320) is configured to support various data formats provided by the user system (340).

In one or more embodiments, the network traffic management tool (320) includes the acquisition module (323) that is configured to obtain a network trace from the computer network (310), for example via data collectors (314). In one or more embodiments, the acquisition module (323) works in conjunction with the data collectors (314) to parse data packets and collate data packets belonging to the same flow tuple (i.e., the aforementioned 5-tuple) to form the network trace. For example, such network trace, or information extracted therefrom, may then be stored in the repository (327) as the network traffic data (330), etc. In one or more embodiments of the invention, the network traffic data (330) includes HTTP traffic data. In one or more embodiments of the invention, the network traffic data (330) includes completed flows that are used as the aforementioned training data for extracting user fingerprints. These completed flows used as the training data are collectively referred to as a historical portion (330a) of the network traffic. In one or more embodiments of the invention, the network traffic data (330) includes more recently completed flows and currently ongoing flows that are collectively referred to as an ongoing portion (330b) of the network traffic. In one or more embodiments, these recently completed flows and currently ongoing flows become completed flows at a later time point and are included into the training data. In other words, the ongoing portion (330b) of the network traffic at a particular time point may be included into the historical portion (330a) of the network traffic at a later time point. In this manner, the network traffic management tool (320) iteratively refines user fingerprints based on iteratively adjusted training data as time goes on.

In one or more embodiments, a flow parser (e.g., acquisition module (323) in conjunction with data collectors (314) in FIG. 1) reconstructs (e.g., eliminates redundant packets, collates packets into a correct sequence, etc.) all the packets that correspond to the same traffic flow (e.g., uni-directional flows (311a), (311b)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments, the flow group generator (324) is configured to perform the aforementioned block delineation. As noted above, the block delineation functionality may group flows into blocks based on at least one of timing, RADIUS information and DHCP information. In one or more embodiments, flows belonging to the same block are originated by the same network end device. Typically, there is a high likelihood that flows belonging to the same block originated from the same device. However, in some cases, flows from different devices may be included in the same block. As noted above, a collection of one or more blocks is referred to as a flow group, such as the user flow group A (332a), user flow group B (332b), flow group (333), etc. A method of generating flow groups are described later.

Block delineation is an operation to determine which sessions, and implicit and explicit information therein, belong to a user. One by-product of block delineation is to determine which user identifiers (found in the sessions grouped as a block) belong to the same user.

In one or more embodiments, one or more of the techniques described below are used by the flow group generator (324) to perform block delineation. Which technique to deploy depends on information available in the traffic and the specific context.

Static Address Assignment Based Technique

If IP addresses are statically assigned to users, all traffic arriving from a given IP address may be univocally assigned to a specific user. The IP address statically and univocally assigned to a user may be deployed as the user's unique identifier. However, this is not mandatory and may not be straightforward in some cases (e.g., if a user has multiple devices, each one with its IP address).

In case the IP address of the user's device is not used as the unique user identifier, a mapping table (also referred to as an address-user identifier mapping table) is provided. The mapping table contains the correspondence between each IP address associated to a user device and the unique user identifier. Attribution of traffic to a user (e.g., tagging each vector with the unique user identifier of the corresponding user) may be done with either an in-line analytic or a batch one. A challenge in the former case is to have relevant information from the address-user identifier mapping table available in memory, because retrieving the mapping table from a permanent storage would not be possible during an in-line operation.

Time Based Technique

If the same IP address may be used at different times by different devices (as it is in most cases), block delineation may be based on the assumption that as long as traffic is continuously generated by an IP address it is coming from the same device (and consequently generated by the same user). If no traffic is observed from an IP address within a configurable interval, it may be possible that the device originally using the address has become idle (e.g., it has released a DHCP lease, it has logged off from a mobile network, or it has been switched off). In the mean time the address may be re-assigned to another device and once traffic is seen again from that address, it cannot be assumed that it is coming from the same device.

As a result, a traffic block is identified as the set of subsequent vectors related to the same client IP address (source and/or destination) whose time stamps are closer than a given time lag. Throughout this disclosure, the terms "traffic block", "session block", and "block" may be used interchangeably depending on the context. Block delineation may be executed in-line. It requires minimal state information: for each IP address currently in use (i.e., for which a block is currently "open") the function may store the time of the last seen vector and a unique block identifier used to tag all the vectors belonging to the same block.

Once blocks are delineated, they may be attributed to a user. A collection of one or more blocks is referred to as a flow group. A flow group attributed to a single user is referred to as a user flow group or a flow group of the user. In the most general case, user attribution may be based on implicit and explicit user identifiers found in the traffic of the block or even on a user fingerprint based on several traffic features. For example, the attributed blocks are shown in FIG. 1A as the user flow group A (332a) and user flow group B (332b) for a user A (not shown) and user B (not shown), respectively. A collection of unattributed blocks is shown in FIG. 1A as the flow group (333). In one or more embodiments, it is assumed that the user responsible of the device associated to an IP address at a given instant is known and available in a (IP address, unique user identifier, time interval) mapping table. The mapping table may be dynamically updated. For example through an API call or through a direct database access.

Block attribution may be done in-line, but this may require the mapping table to be available in memory as reading it from permanent storage may be incompatible with the real-time vector processing requirements. Moreover, any update to the mapping table may be propagated instantly so that new mappings are used as soon as vectors related to an IP address with a new mapping are processed.

DHCP Based Technique

If DHCP vectors, i.e., vectors containing metadata or protocol information extracted from traffic of the Dynamic Host Configuration Protocol (DHCP), are interleaved with data vectors, i.e., vectors containing information extracted form data traffic sessions/flows (in juxtaposition with DHCP traffic that fulfills a service functionality), delineation may be based on the DHCP offers/acks and DCHP release messages. DHCP-based block delineation may be performed in-line.

Block attribution requires a table that maps the user owning the device to a given MAC address. In a possible embodiment such table is static (or with very infrequent updates). In one or more embodiments, block attribution is performed in-line. This requires that vectors are processed right away as they are produced by the data collectors (314) and in the same order in which they were produced. In order to support in-line block attribution, the above table may have to be available in memory to comply with real-time performance requirements. If DHCP vectors are not interleaved with data vectors, block attribution requires correlating each block with the corresponding DHCP vectors, which may not be achievable in-line.

RADIUS Based Technique

If RADIUS vectors are interleaved with data vectors, delineation may be based on the RADIUS log on and RADIUS log off exchanges. RADIUS-based block delineation may be performed in-line.

Traffic attribution to a user may be based on the radius identifier. If RADIUS traffic is interleaved with data traffic, traffic attribution may be done in-line. Otherwise, it requires correlating data with corresponding RADIUS vectors, which may require a batch analytic.

In one or more embodiments, the user activity analyzer (325) is configured to perform information/activity/feature extraction. In one or more embodiments, features (i.e., relevant pieces of information, such as feature (333a) shown in FIG. 1A) are extracted from each traffic flow and may include one or more of the following:

Features Based on User Identifiers

A user identifier is a parameter employed by an Internet service to uniquely represent or track a user. The identifiers may be explicit, such as personal names or email addresses. On the other hand, many Internet services employ their own and less obvious implicit user identifiers, which seem a priori random, such as some numerals or strings. For example, Facebook® internally uses numeric identifiers for user identification. Table 1 shows several user ID types found in Internet traffic.

TABLE 1

| User ID | Can be found at: | Sample |
| --- | --- | --- |
| Facebook ID | HTTP URL Cookie | session_key=#####-< Facebook ID > c_user=< Facebook ID >; m_user=email%3a< Facebook ID > |

TABLE 1-continued

| User ID | Can be found at: | Sample |
| --- | --- | --- |
| Twitter ID | HTTP URL | oauth_token=<Twitter ID>-##### |
| Email address | Cookie | m_user=email%3a |
| | IMAP payload | USER=email@domain.com |
| | POP3 payload | LOGIN=email@domain.com |
| | MSN payload | MSNMSGR=email@domain.com |

Recognizing user identifiers employed by numerous Internet services would be infeasible to accomplish by manual inspection. Automated learning of user identifiers may be performed based on two metrics: persistency and uniqueness. The reasoning behind the uniqueness metric is to compare parameters appearing in the traffic of various users and keep only the parameters that are unique to each individual user. Observing the parameters over large user groups and over extended time, sufficiently prunes the set of representative identifier candidates. However, in the pruned parameter set, there will be many other items which do not identify users. For example, such parameters are short-term session identifiers, authentication nonces, website-specific short-term parameters, etc. To refine learning of user identifiers, the persistency metric is used, which is a measure of time during which a parameter remains unchanged. Accordingly, the parameters that are unique to a user as well as remain invariant over long time intervals may be selected for user identifiers.

Features Based on Hostname and Domain Name of Accessed Servers

Apart from direct user identifiers described above, a number of features related to user's online behavior may have user-identifying properties. Such features commonly reflect personal interests that individually or as a set may clearly point to a specific user.

Tracking users on basis of host- or domain names the users visit is one such user-identifying feature. For example, observing that a user repeatedly visits a website of a university indicates that the user is somehow affiliated with that university. If the user further visits sites that sell books at the beginning of each semester, the user is likely a student. Even further, if the student follows news from a specific town, he is likely to have family there. Following this line of investigating hostnames, a user may iteratively be identified in a large population.

Features Based on Web Service

Analyzing web services is an augmentation of host-based user fingerprinting. In fact, the same host may provide several services. In one example, different services are provided through different ports. In another example, when services are accessed through the HTTP or HTTPS protocol, different services may be accessed by using different URLs. In Internet, there are numerous web services whose traffic may help our system gain a detailed understanding of personal interests as well as track user actions. For example, to learn about music preferences, users' interactions with Pandora® or iTunes® music services may be tracked. In the case of Pandora®, personal music genre preferences may be learned by looking at the users' HTTP GET messages and extracting the nominal values of a key-value pair genre=<value>.

Similarly, shopping preferences may be extracted by looking into the three-letter shopping categories in Craigslist's HTTP GET messages (e.g., AOS: automotive, BKS: books, ELE: electronics, etc.). The analysis may also be conducted on the queries sent to search engines, categories of videos and books being viewed, and so forth.

Features Based on Mobile Apps and Traditional Applications

With a rapid growth of smartphone usage and an increasing trend of embedding web communications in various applications, users may also be fingerprinted by the apps/applications they use.

A number of features are based on hundreds of thousands of applications communicating via Internet. For mobile apps, the features may be based on regular expressions which capture occurrences of app-identifying parameters occurring in the apps' traffic, as well as the traffic of advertizing and analytic services embedded in the apps. For example, TABLE 2 illustrates that an app may be identified by observing the value of the parameter "app_name=" in the traffic exchanged with Googleads®.

Table 2
GET /pagead/images/go_arrow.png HTTP/1.1
Host: pagead2.googlesyndication.com
referer: http://googleads.g.doubleclick.net:80/& . . . . &
app_name=4.andriod.zz.rings.rww2 & . . . . User-Agent: Mozilla/5.0 (Linux; U; Android 2.3.3; . . . .

In case of regular applications communicating via Internet, a technique that automatically extracts entire state machines of the apps' communications identified via traffic observations is described in U.S. Pat. No. 8,494,985 entitled "System and Method For Using Network Application Signatures Based on Modified Term Transition State Machine." In one or more embodiments, the extracted state machines described in U.S. Pat. No. 8,494,985 are used as the features of traffic flows under the analysis.

Features Based on Geo-Reports

Increased popularity of online geo services, such as Google Map®, as well as wide spread usage of location-based services in smartphones, has brought reports of users' whereabouts to Internet traffic. These reports, similar to the previously described apps or web services, may have user-identifying properties. Such properties are based on extraction and identification of specific user interests in the physical world locations and content. Geo-reports provide a link between the online and physical worlds. For example, online users may be identified by analyzing the traffic related to physical locations that users visit. Similarly, the system may leverage its knowledge about the locations that users visit in the physical world in order to extrapolate it to the online content that users may be interested in browsing, thus becoming capable of attributing the corresponding browsing traffic to the appropriate user identities. On the other hand, geo-reports found in traffic may not even represent true user locations, but places that users are browsing for online directly. Correspondingly, the system may use online activity to predict users' future reporting in the physical world, i.e., the online browsing reports may be extrapolated to the locations that will be reported in the physical world as an indication of the users' identity.

Geo-reports are key-value pairs that appear in the Internet traffic as longitudes and latitudes. The reports may be found in communications of various Internet services, which individually choose their reporting format. Specifically, the names of keys that represent latitude or longitude values may be different for different services. Commonly, geo-reports may be found in HTTP URIs or communication payloads, e.g., XML content, JSON dictionaries, etc. An example of a geo-report employed by Google®'s mobile search is shown in TABLE 3 below.

Table 3
www.google.com/m/gne/suggest/
v2?q=&hl=en&app=iss&appv=133247963&platform=android&gl=US&s11=45.718672,-121.514698&acc=457&feeds=qs,list,ns Features Based on Visited and Sought PoIs In their raw form, geo reports representing merely numeric latitude and longitude values may not be sufficiently informative to be used as user-identifying parameters. Instead, if these raw reports are translated to venues or landmarks (points of interest) that exist at the reported locations, such transformed data may provide the context of locations that are of interest to users, which then becomes a user-identifying feature. To translate raw geo-reports to meaningful places, a number of location services may be leveraged. These services, such as Google Places®, provide the translation for both the reports related to actual user locations as well as the reports obtained from users' online browsing.

Next, multiple PoIs may correspond to a single latitude-longitude report. Then, the system performs a refinement to identify a subset of PoIs that may be of interest to the user as means of obtaining a user-identifying reference. To this end, the system uses a number of scoring metrics to choose a subset of PoIs that the user is most likely to visit or browse for online. The scoring is based on the proximity of "ambiguous" PoIs to the reported location, as well as the context of the PoIs and the report's time. First, for each report, an equal score update may be attributed to the candidate PoIs within the report's accuracy range. For example, if the report is ambiguous in an area of 20 $m^2$, and there are 5 PoIs within that area, the scores of all 5 PoIs may be updated by an equal amount. Then, leveraging repetitive patterns of human mobility, the scores may be accumulated historically and (with the help of score updates) the system may decide which of the 5 PoIs is the most relevant, i.e., has the highest cumulative score for the user.

The contextual aspect of scoring helps discover user interests in particular brands, venues or activities. For example, separate scores may be kept for the exact PoIs and PoI categories. While the exact PoIs help reveal venues, the categories may help revealing interest in specific activities as well as help infer specific venues when the reports themselves are not sufficiently indicative. For example, if categories reveal that a user has a strong interest in coffee (say by observing his frequent visits to Starbucks®), then it is determined that the user is at a coffee shop, such as Peet's® coffee, when a geo-report offers a choice between a bar, a tennis court, and a coffee place.

Finally, the scoring involves characterization of temporal patters which are also inherent to human mobility at many timescales. For example, people like to visit gym after work, people like to go out to their favorite places on weekends, etc. Such aspects of human behavior are captured by maintaining individual scores over diverse time intervals. For example, individual scores may be computed on the traffic obtained in morning hours, afternoons and evenings; or on Mondays, or each spring, etc. Then, the user-identifying interests are the ones that have distinctive scores at particular scoring timescales.

Features Based on Relationships

A part of user fingerprinting is discovery of user's social relationships. Identifying such relationships may be an extremely complex task, because many times the relationships may only be inferred. For example, two people posting comments on a similar topic within a similar time frame may be in some sort of interaction. Similarly, the interaction may exist between people that regularly visit one or more common places. Accordingly, publically available content in online social networks as well as the headers of various communication services may be used as indicative features. For example, an indication of a relationship between two persons, such as Facebook® friendship or cross posting; Twitter® following, replying or re-tweeting; email sending, receiving or forwarding, etc. may be used as the features.

In one or more embodiments, the user activity analyzer (325) is further configured to perform traffic attribution and block correlation. Being originated to the same device, flow blocks (also referred to as traffic blocks) may be considered to correspond to a single user. Traffic attribution identifies the user that generated the traffic by comparing user identifiers found in the traffic with the user identifiers (user IDs) that are readily known to be associated to the given user.

It is worth noting that a block may contain many user identifiers. In a possible embodiment, multiple user IDs appearing in the same block would indicate that these user IDs in fact do belong to the same user. The function of associating various user IDs to the same identity or persona of a user is called user ID correlation. When traffic blocks contain identifiers of multiple users, such as user U1 and U2, the blocks may be attributed to a single user if: (i) there is at least one traffic block in which both U1 and U2 appear together or (ii) as long as there is at least one flow block in which a third user ID U3 is found together with U1, as well as at least one flow block that ID U3 is found together with U2. Hence, user ID correlation also performs a correlation of blocks containing the traffic generated by the same user.

User correlation is a process of indentifying which different user IDs correspond to the same user. To achieve user correlation, the first step is to associate a unique user ID to each vector in the block at the stage of block attribution. Any other implicit user identifiers found in the vectors are associated to that unique user ID. Such association between implicit and explicit user identifiers found in the traffic may be stored permanently for future reference. Similarly, the unique user identifiers are also permanently stored. Consequently, if a block cannot be attributed to a user uniquely and deterministically (e.g., through one of the approaches presented above, such as mapping tables or RADIUS), the implicit user IDs may be used instead for this purpose.

A side effect of attributing flows to users is that different blocks become correlated by means of features extracted from the corresponding traffic flows. Features extracted in flows belonging to one block may help attribute another block to a user. Consequently, all extracted features may be considered a part of the user's fingerprint.

In one or more embodiments, the user activity analyzer (325) is further configured to perform fingerprint creation and fingerprint feature selection. With a portion of the captured traffic already attributed to users in a form of flow groups (e.g., user flow group A (332a), user flow group B (332b)), the features existing in the flow groups may be statistically characterized for their quality of becoming the fingerprinting features. The features with good quality may then be used as user fingerprints (e.g., fingerprint A (332a1), fingerprint B (332b1)), In other words, the features with good quality may be used to attribute more traffic (that was previously uncharacterized) to users.

Some of the features that are examined in each block of flows for their user-identifying properties are the explicit user identifiers embedded in the traffic, the apps used by the user to generate those flows, the network services accessed by the user via those flows, and the geo-location information embedded in those flows indicating where the user is when the traffic is generated, i.e., any one or multiple of the features described above. The explicit user identifiers may be used to attribute traffic to users in a deterministic way, and therefore are referred as deterministic features. Examples of deterministic features include online social network IDs, email addresses, etc. Other features, such as services/apps used by the users, the geo-location information of users, are used to attribute traffic to users according to their statistical properties (models), and therefore are referred as statistical features. Each statistical feature may not be specific to users. However, the combination of multiple features may provide enough information to fingerprint users with high accuracy. For example, an app may be used by large number of users, but the combination of a set of apps may be very specific to a user; a set of network services may be used by many users, but a user may use those network services only when he is at certain location, and therefore the combination of a set of web services and user's geo-location information provides the specificity to fingerprint a particular user.

The statistical features are evaluated towards assessing their quality in fingerprinting individual users. The quality of the extracted features is assessed based on two important properties, uniqueness and persistence. The uniqueness property of an extracted feature measures how unique the feature is in identifying a user. In other words, the uniqueness property indicates how specific a feature is to a user. The persistence property of an extracted feature measures how sticky the feature is to a user. In other words, how often the feature appears in the network traffic generated by the user.

The exact way of measuring uniqueness and persistence may be specific to each extracted feature. An example is described below. Assuming the number of distinct users identified by the system is $U_{all}$ and the number of users having the same feature $f_x$ is $U_{f_x}$, then the uniqueness of this feature $f_x$ may be measured as:

$$\text{Uniqueness} = 1 - \frac{(\llbracket U \rrbracket_{f_x} - 1)}{U_{all}}$$

Obviously, a feature having a uniqueness measure of 1 means that only one user has that feature. When a feature has a uniqueness measure lower than 1, it means that the system has observed multiple users having that feature. Thus, the closer is the feature's uniqueness to 1, the more specific that feature is to some user, and therefore the more useful for identifying the users.

Let $T_{all}$ be the total duration of time the system has observed some user's online activity, and $T_{f_x}$ be the duration of time the system has observed feature $f_x$ appearing in some user's online activity. Then, the persistence measure of the feature $f_x$ can be defined as:

$$\text{Persistence} = \frac{T_{f_x}}{T_{all}}$$

Initially the network traffic management tool (320) does not have any statistical fingerprints of users. With some seeding knowledge, the network traffic management tool (320) starts to attribute a portion of traffic to users and extracts user related features from the attributed traffic. The quality of the extracted features is assessed and those features with good uniqueness and persistence properties are then absorbed by the network traffic management tool (320) as user's statistical fingerprints. The assessment may be based on predefined criteria such as some carefully tuned thresholds. The statistical features whose quality is assessed as not good enough are stored by the network traffic management tool (320) as candidate fingerprints. As new user related features are discovered, the network traffic management tool (320) also reassesses the quality of existing user fingerprints and those candidate fingerprints, in addition to assessing the newly discovered features. After the assessment, previously good fingerprints may be demoted as not good enough, and candidate fingerprints may be promoted as good fingerprints.

In a possible embodiment, a traffic block (e.g., part of the flow group (333)) not attributed to any known user, neither deterministically nor statistically, is examined by the network traffic management tool (320) to extract user related statistical features (e.g., feature (333a)). In this case, the network traffic management tool (320) assumes there is a "new user", although the identity of this new user is yet unknown. This new user is assigned to a system-created user identify X and the network traffic management tool (320) starts learning new features of this new user as well. If the network traffic management tool (320) learns later that this user X's fingerprints are very similar to a known user Y's fingerprint, the fingerprints of X and Y are merged.

In a possible embodiment, the user's statistical fingerprints are employed in detection of false positives in the user ID updating (i.e., in detection of a wrong inference that two IDs belong to the same user). If multiple user IDs are extracted from the same traffic block and that block contains statistical fingerprints of multiple users, the system determines that the traffic was indeed generated by multiple users, i.e., the user IDs found in the block should not be considered to belong to the same user. An example of this scenario is that multiple users are sharing the same NAT device, so the block delineation incorrectly creates a single-user traffic block which was in fact generated by multiple users.

In a possible embodiment, the user statistical fingerprints may help to detect some cases that are difficult to detect by other means. For example, the features extracted from a block of traffic may be compared against the user IDs and the user statistical fingerprints. Let's assume that the user ID matching indicates that the traffic block is generated by user X, because this user's account is found in the RADIUS flows. In the meantime, the statistical fingerprint matching outputs that the traffic block is generated by user Y, because the set of network services uniquely used by user Y is present in the traffic. In this case, it is determined that user Y may have borrowed user X's device.

Fingerprint Based Traffic Attribution

For the unattributed flow groups (e.g., flow group (333), etc. in the ongoing portion (330b) of the network traffic data (330)) which do not contain any user IDs in their traffic data, the flow groups (e.g., flow group (333), etc.) are attributed to fingerprints based on the distributions of features (e.g., feature (333a), etc.) the groups have. For this, the user activity analyzer (325) extracts features (e.g., feature (333a), such as the most frequently accessed web services) from the flow groups (e.g., flow group (333), etc.) and check if a subset of the features matches any of the fingerprint(s) from the fingerprint database (e.g., including fingerprint A (332a1), fingerprint B (332b1), etc.). Because the features may be comprised of very specific information (e.g., feature URLs mail.yahoo.com and mail.aol.com are considered to be distinct while they both represent emailing activity of users). In order to cover wider range of user activities with those specific fingerprints, the features are grouped into a few classes. Notice that there are some features general enough by nature. Therefore, a feature may be designated as equivalent to a class in order not to force all features to be grouped.

Classification of Fingerprints

In order to reveal the types of activities users are engaged in, user's online activities (e.g., websites they frequently visit) are analyzed and classified. For example, the user's online activities may be represented by the DNS names associated with various services, which often provide a good indication of the category of activities that users are engaged in. For instance, mail.yahoo.com indicates that a user is checking email; www.youtube.com indicates that the user is browsing and watching videos online. Therefore, the DNS names are obtained from the unassociated flow groups and then broadens the coverage of the DNS names by associating them to a service class and a service provider.

TABLE 4 lists an illustrative summary of the service classes, keyword samples used to classify DNS names into each service class, and service provider samples of each class. Notice that, similarly to the websites users visit, one may build such classification for any features considered as indicative of user activity. To represent classification on wider variety of more generic types of features, the classes used in the classification are referred to as "feature classes". In other words, each line entry of TABLE 4 corresponds to a feature class. More specifically, the first element of each line entry is a feature class.

TABLE 4

| Service class | Keywords | Service provider |
| --- | --- | --- |
| Banking | bank | wellsfargo, morganstanley |
| Blog | blog, buzz | huffingtonpost, boingboing |
| Book | book | barnesandnoble, half.com |
| Chat | talk, chat, messenger | skype, mtalk.google, aim |
| Dating | personals, harmony, match | plentyoffish, date |
| E-commerce | warehouse, market, buy | amazon, ebay, blockbuster |
| Education | .edu, college, eduction | medexch.med.unc.edu |
| Email | smtp, imap, pop, exchange | google, hotmail, yahoo |
| File hosting | upload, download, ftp | megaupload, dropbox |
| Gaming | game, casino | zynga, farmville, xbox |
| Map | maps, virtualearth | maps.google, wikimapia |
| Music | music, radio, paylist | pandora, itunes, zune |
| News | news | msnbc, ew, cnn |
| P2P | tracker, torrent, mininova | No specific domain |
| Picture | picture, photo | flickr, picasa.google |
| Search | search | google, bing, yahoo |
| Social | social | OSN1, OSN2, ning |
| Sports | sports | espn, bleacherreport |
| Travel | travel, hotel, flight | expedia, kayak, southwest |
| Video | video | netflex, youtube |
| Weather | weather, forecast | No specific domain |

For each unattributed flow group $u_i$?aaU, let $s_i^j$ be a feature class identified from $u_i$'s traffic by feature classification (each $s^j$ is a feature class). Let $S(u_i)$ be the list of distinct $s_j$ associated with the traffic in the flow group, such that $S(u_i)_i = \{s_i^j\}$. Because $S(u_i)$ contains all the $s_i^j$ including the ones flow $u_i$ contained only once during the observation period of the system, considering the entire $S(u_i)$ may introduce inconsistency in determining the user behind flow $u_i$'s activity pattern.

To consider the most representative activities of users, the top k most frequently appearing feature classes $F_i$?aUS($u_i$) are used, where the length $|F_i|=k$. $F_i$ is referred to as a "representative feature class" of flow group $u_i$. The choice of k affects flexibility of mapping fingerprints to flow groups. Consider an example flow group with four features [$\{f\}_1, f_2, f_3, f_4\}$, existing fingerprints are compared to the flow group based on the representative feature class. If the length of feature class is chosen to be k−2 and F−[$\{f\}_1, f_2\}$, then any existing fingerprints containing [$\{f\}_1, f_2\}$ is considered as a match. Whereas if k=4 and F=[$\{f\}_1, f_2, f_3, f_4\}$ then only fingerprints with all four features are considered matching the flow group. As shown in the above example, the degree of the matching is configurable by choosing the value of k. A small k allows various fingerprints to be mapped to a flow group. A large k, on the other hand, allows only a small number of fingerprints to be mapped.

While, in this particular case, user activity is represented by the frequency of feature classes, it may be generalized to consider any statistical distribution (than just the distribution of top k features) that is able to distinguish activities (or properties) of a user from that of others.

Verification of Fingerprint Classes

Given a flow group, there may be more than one fingerprint contained in it. In order to determine whether a fingerprint is good or not, a comparison is performed among fingerprints. Based on an assumption that a good fingerprint should be highly unique, a fingerprint in a flow group is verified whether it frequently reappears in other flow groups that contain other fingerprints.

Formally, let $N(G_i)$ be the set of flow groups in which a fingerprint $G_i$ attributes to. Let $R(G_i)$ be the set of fingerprints (other than $G_i$) co-occurring with $G_i$ in a flow group. Set size of R (which we denote as $|R(G_i)|$) represents the number of unique fingerprints co-occurring with $G_i$. Thus, a fingerprint is removed from the existing fingerprints if it appears too frequently (i.e., over a predetermined co-occurrence rate threshold) with other fingerprints. In other words, if $|R(G_i)|/|N(G_i)|<\tau$, the $F_i$ is discarded from the existing fingerprint database.

Traffic Attribution

Two or more flow groups are associated if and only if their feature classes all match the same fingerprint classes. As a result, flow groups that share statistical fingerprints are associated together. Consequently, the two or more associated flow groups are attributed to the same user, i.e., it is concluded that the same user generated the traffic that is part of the two or more flow groups. The remaining flow groups which may not have been attributed to any user even with statistical matching are simply forwarded to a reporting system as failures.

In one or more embodiments, the network traffic manager (326) is configured to perform per-user policy enforcement based on a database of per-user policies (e.g., user policy (334)). Once a block is identified as having been originated by a device operated by a specific user, the policies related to the specific user are retrieved to configure the network traffic manager (326). For example, the user policy (334) may cause the network traffic manager (326) to operate in at least one of two modes:

(a) per block policy enforcement, i.e., the policy (334) is applied to those blocks that are associated to a given user by the fingerprint-based traffic attribution.

(b) per device policy enforcement, i.e., once a block is associated to a user, her policies are applied to all traffic coming form the source address (e.g., IP address) originating the traffic in the block. In this operation mode the network traffic manager (326) will keep track of the last user a given source address had been associated to. In case that changes, the network traffic manager (326) may retrieve the policies of the new user for reconfiguration. An example type of policy that may be reconfigured is one that requires the user to re-authenticate.

Continual Identification and Policy Enforcement

The disclosed method continually runs user fingerprint generation and policy enforcement as the device generates traffic. When a device is used by a user other than the one previously identified, changes in the user fingerprint are detected by the user activity analyzer (325) to attribute the new traffic to the new user's identity. In turn, the network traffic manager (326) retrieves and applies new policies that pertain to the new user.

Figure 1B:
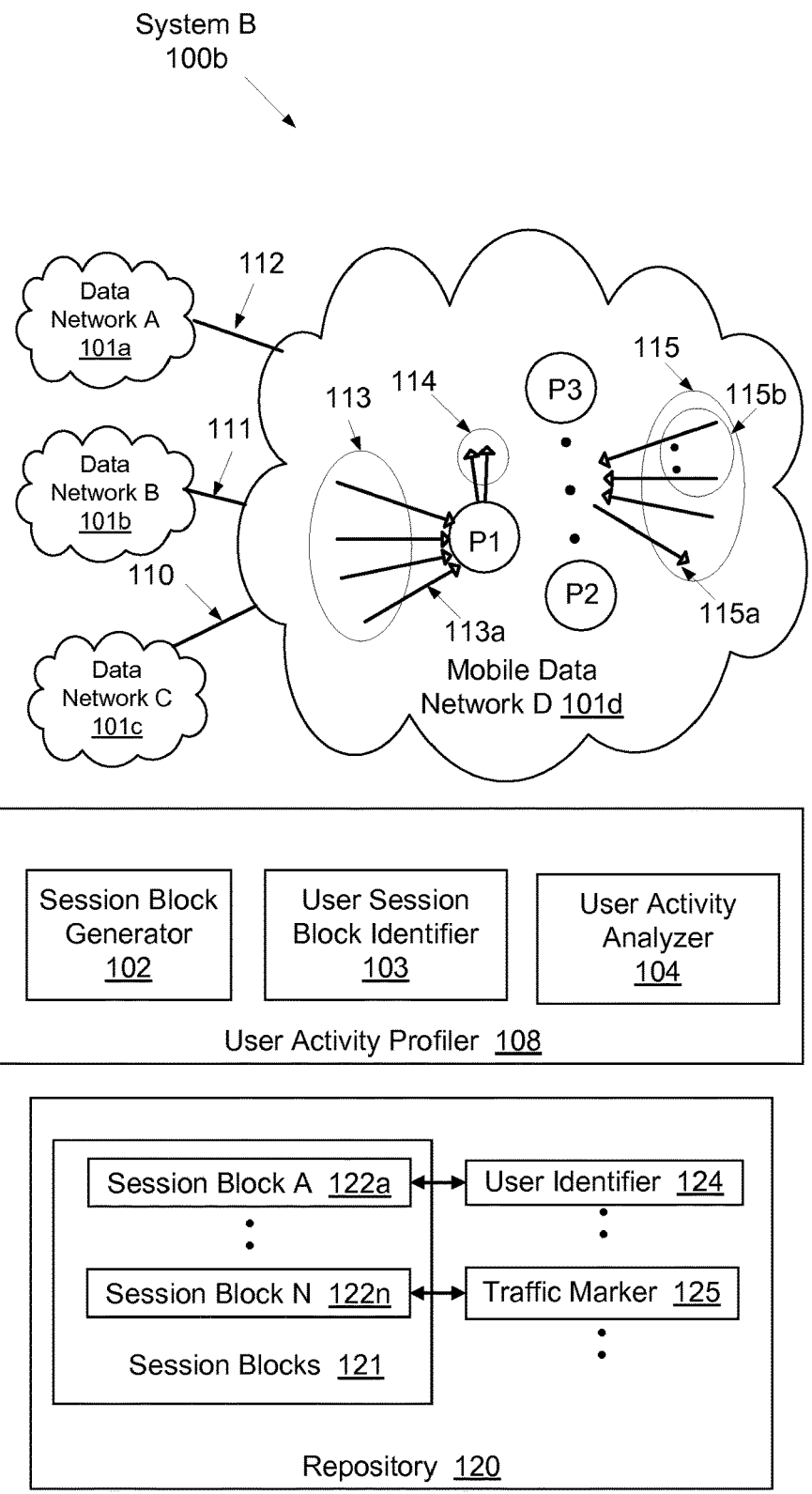
FIG. 1B shows a system block diagram according to aspects of the invention.

FIG. 1B shows a system block diagram of a system B (100b) in accordance with one or more embodiments of the invention. In one or more embodiments, the system B (100b) is an example of the system A (100a) depicted in FIG. 1A above. In particular, the session block generator (102) and user session block identifier (103), depicted in FIG. 1B, form an example of the flow group generator (324) depicted in FIG. 1A above. Specifically, the session block described in reference to FIG. 1B below is an example of the flow group described in reference to FIG. 1A above. In addition, the user activity analyzer (104), depicted in FIG. 1B, is an example of the user activity analyzer (325) depicted in FIG. 1A above. Further, the data networks A through D (101a, 101b, 101c, 101d), depicted in FIG. 1B, correspond to the computer network (310) depicted in FIG. 1A above. The repository (120), depicted in FIG. 1B, corresponds to the data repository (328) depicted in FIG. 1A above.

Those skilled in the art, having the benefit of this detailed description, will appreciate the components shown in FIG. 1B may differ among embodiments of the invention, and that one or more of the components may be optional. Although specific numbers of components are shown in FIG. 1B, different number of each component may be included. In one or more embodiments of the invention, one or more of the components shown in FIG. 1B may be omitted, repeated, supplemented, and/or otherwise modified from that shown in FIG. 1B. Accordingly, the specific arrangement of components shown in FIG. 1B should not be construed as limiting the scope of the invention.

As shown in FIG. 1B, the system B (100b) includes data networks A through D (101a, 101b, 101c, 101d), a user activity profiler (108) having a session block generator (102), a user session block identifier (103), and a user activity analyzer (104), and a repository (120) storing session blocks (121) (e.g., session block A (122a), session block N (122n), user identifiers (e.g., user identifier (124)), and traffic markers (e.g., traffic marker (125)). Each of these networks A through D may be a portion of a larger network and are shown to be coupled via links (110, 111, 112). This larger network may include wired/wireless portions of local area network, wide area network, Internet, and/or other computer and communication networks. In particular, the network D (101d) is a mobile data network, also referred to as a mobile network, such as a cellular phone network. The mobile data network D (101d) includes hosts (P1, P2, P3, etc.). As shown, host (P1) is a source or destination associated with flows (113, 114) while hosts (P2, P3, etc.) are source(s) or destination(s) associated with flows (115). Accordingly, the flows (113, 114) are referred to as attached to the server (P1) while the flows (115) are referred to as attached to the servers (P2, P3, etc.). In particular, the flows (113) include a particular flow (113a) while the flows (115) include another particular flow (115a). Further, a portion of the flows (115) is a set of unidirectional flows (115b). In one or more embodiments of the invention, each flow in these flows (113, 114, 115) relates to an application executing on the attached server at a particular time. For example, flows (113) may include commands (e.g., HTTP command such as GET, POST, DELETE, etc.) of an application sent from various clients (not shown) to the server (P1) while the flows (114) may include responses (e.g., HTTP response such as 200 OK, 404 Not Found, etc.) of the application sent from the server (P1) to various clients in return. Accordingly, the flows (113, 114) are referred to as "associated with an application executing on server (P1)", "corresponding to an application executing on server (P1)", "generated by an application executing on server (P1)", "generated to execute an application on server (P1)", or "generated for executing an application on server (P1)" in an interchangeable manner depending on the context unless explicitly stated otherwise. Although the servers P1, P2, and P3 are shown to be within the mobile data network D (101*d*), one or more of these servers may also be part of other data networks (e.g., data network A through C (101*a*, 101*b*, 101*c*)) and accessible from within the mobile data network D (101*d*).

In one or more embodiments of the invention, the client devices (not shown) associated with the aforementioned flows in the mobile data network (101*d*) are mobile computing devices configured with wireless communication capabilities, such as smartphones, tablet computers, notebook computers, etc. In one or more embodiments, users of these mobile computing devices access the services provided by various servers (e.g., P1, P2, P3, etc.) using connection provided by mobile data network service providers (not shown), such as a cellular phone service provider. In one or more embodiments, the mobile data network service providers (not shown) assign different IP address to a user mobile computing device for different application sessions. Said in other words, an IP address may be dynamically assigned to different user computing device during different time periods.

In one or more embodiments of the invention, data packets of the network traffic flows (e.g., flows (113), flows (114), flows (115), flows (115*b*), etc.) may be observed and collected, for example using a sniffer device from links (110, 111, 112). The collected data packets may be filtered and organized regarding duplicate records or out-of-order records. Accordingly, the collected data packets are reconstructed into a flow in an appropriated order (e.g., based on sequence information in the headers) consistent with the Internet transaction performed by the flow. Throughout this disclosure, "obtaining a flow" may refer to obtaining a complete flow or any portion thereof depending on the context unless explicitly stated otherwise.

As noted above, in client-server application scenarios, flows generated by the application are preceded by DNS flows to identify the server IP from domain name in a client command. For example, the client requests content from a server in the network by specifying the domain name of the server in the request command. The actual server IP address is then returned by DNS mechanism (e.g., a DNS server) of the network based on the domain name. Throughout this disclosure, the terms "content," "resource," and "service" may be used interchangeably to refer to any of content/resource/service requested by a client and provided by a server. Further, the terms "client," "client device," "client IP," and "client IP address" may be used interchangeably depending on the contexts; the terms "server," "server device," "server IP," and "server IP address" may be used interchangeably depending on the contexts.

In one or more embodiments of the invention, the user activity profiler (108) includes the session block generator (102) that is configured to identify, from the mobile data network D (101*d*), application sessions each containing flows such as flows (113), flows (114), flows (115), etc. Specifically, the 5-tuple flows are parsed into application sessions according to the specific protocol. For example, all HTTP requests and replies of the same persistent TCP connections are grouped into a single session. Similarly, TCP flows belonging to a SMTP transaction (between SMTP HELO to QUIT) become a single SMTP session. Likewise, DP flows to the same DNS access turn into a DNS session.

In one or more embodiments, the session block generator (102) is further configured to analyze the application sessions to determine session blocks (e.g., session block A (122*a*), session block N (122*n*)). Specifically, each session block includes application sessions sharing an IP address and is defined based on a minimum separation time with any other session block sharing the IP address. In one or more embodiments, this IP address is assigned to a user computing device by a mobile network service provider. Additional details of determining session blocks are described in reference to FIG. 1C below.

In one or more embodiments of the invention, the user activity profiler (108) includes the user session block identifier (103) that is configured to extract user identifiers (e.g., user identifier (124)) from the application sessions based on a pre-determined criterion. Generally, the application sessions relate to multiple users of the mobile data network D (101*d*). In one or more embodiments, the user identifier is an online social network (OSN) user identifier, and the pre-determined criterion is based on an OSN-specific parsing algorithm applied to the application sessions.

As noted above, many OSN sites "leak" the OSN user identifiers, which provide the basis for attributing network traffic to real users. Since each OSN has its own specific design, bit-strings/character-strings (e.g., in HTTP headers) used by an OSN for uniquely identifying each user are empirically determined as a basis for the OSN-specific parsing and analysis. Apart from the user identifiers used by OSN sites, other user identifiers such as email addresses are often leaked by various services and protocols (e.g., unencrypted webmail, POP, or IMAP) and may therefore be used as user identifiers for the purpose of traffic attribution. In one or more embodiments, the pre-determined criterion for extracting email address as user identifiers is based on a layer-7-application-specific parsing algorithm applied to the application sessions. TABLE 5 summarizes example formats of user identifiers and where they are located.

TABLE 5

| OSN IDs | Where to find | String to find | Sess. coverage |
|---|---|---|---|
| OSN1 ID | *.osn1domain.com:URL | session_key=#####-<OSN1_ID> | 166441/1.3% |
|  | HTTP:cookie | c_user=<OSN1_ID>: |  |
|  | HTTP:cookie | m_user=email%3a<OSN1_ID> |  |
| OSN2 ID | *.osn2domain.com | oauth_token=<OSN2_ID>-##### | 119849/1.0% |
| Email addr. | HTTP:cookie | m_user=email%3aOSN1_ID | 24147/0.2% |
|  | IMAP/POP3:payload | USER=email@domain.com |  |
|  | MSN:payload | MSNMSGR=email@domain.com |  |

In one or more embodiments, the user session block identifier (103) is further configured to extract a traffic marker (e.g., traffic marker (125)) from the session blocks (121) based on a user identifier (e.g., user identifier (124)). In one or more embodiments, the traffic marker (125) is a data string, such as key-value strings(s) of a cookie. In one or more embodiments, the traffic marker (125) is another user identifier (e.g., OSN user identifier or email address) used by the same user. In one or more embodiments, the traffic marker (125) is identified based on a measure of co-occurrence in the session blocks (121) between the user identifier (124) and a data string. Specifically, the data string is identified as the traffic marker (125) in response to the measure meeting a pre-determined threshold. In one or more embodiments, the measure includes a uniqueness measure and a persistence measure. Additional details of extracting the traffic marker (125) from the session blocks (121) based on the user identifier (124) are described in reference to FIG. 1C below.

In one or more embodiments, the user session block identifier (103) is further configured to identify a first portion of the session blocks (121) based on the user identifier (124). In particular, each session block in the first portion contains the user identifier (124) and is thus associated with mobile network activities of a user identified by the user identifier (124). For example, the first portion may include the session block A (122a) that is identified to contain the user identifier (124). In one or more embodiments, the user session block identifier (103) is further configured to identify a second portion of the session blocks (121) based on the traffic marker (125). In particular, each session block in the second portion contains the traffic marker (125) and is thus associated with mobile network activities of the user. For example, the second portion may include the session block N (122n) that is identified to contain the traffic marker (125). In one or more embodiments, the first and second portions of the session blocks (121) identified above are filtered by eliminating any session block that contains more than one user identifier or contains more than one time-to-live (TTL) values.

In one or more embodiments of the invention, the user activity profiler (108) includes the user activity analyzer (104) that is configured to analyze the first portion and the second portion of the session blocks (121) to determine a measure of a mobile network activity of the user. For example, domain name service (DNS) server names may be extracted from the first portion and the second portion of the session blocks (121) and analyzed to determine the measure of the mobile network activity of the user. Accordingly, multiple users' various activities in the mobile network may be characterized. Further, user profiles may be extracted from the mobile network based on user identifiers of these multiple users. In one or more embodiments, a measure of privacy leak in the mobile network is generated based on the user profiles and various measures of mobile network activities of these users. Additional details of extracting the traffic marker (125) from the session blocks (121) based on the user identifier (124) are described in the example shown in FIGS. 3A and 3B below.

Figure 1C:
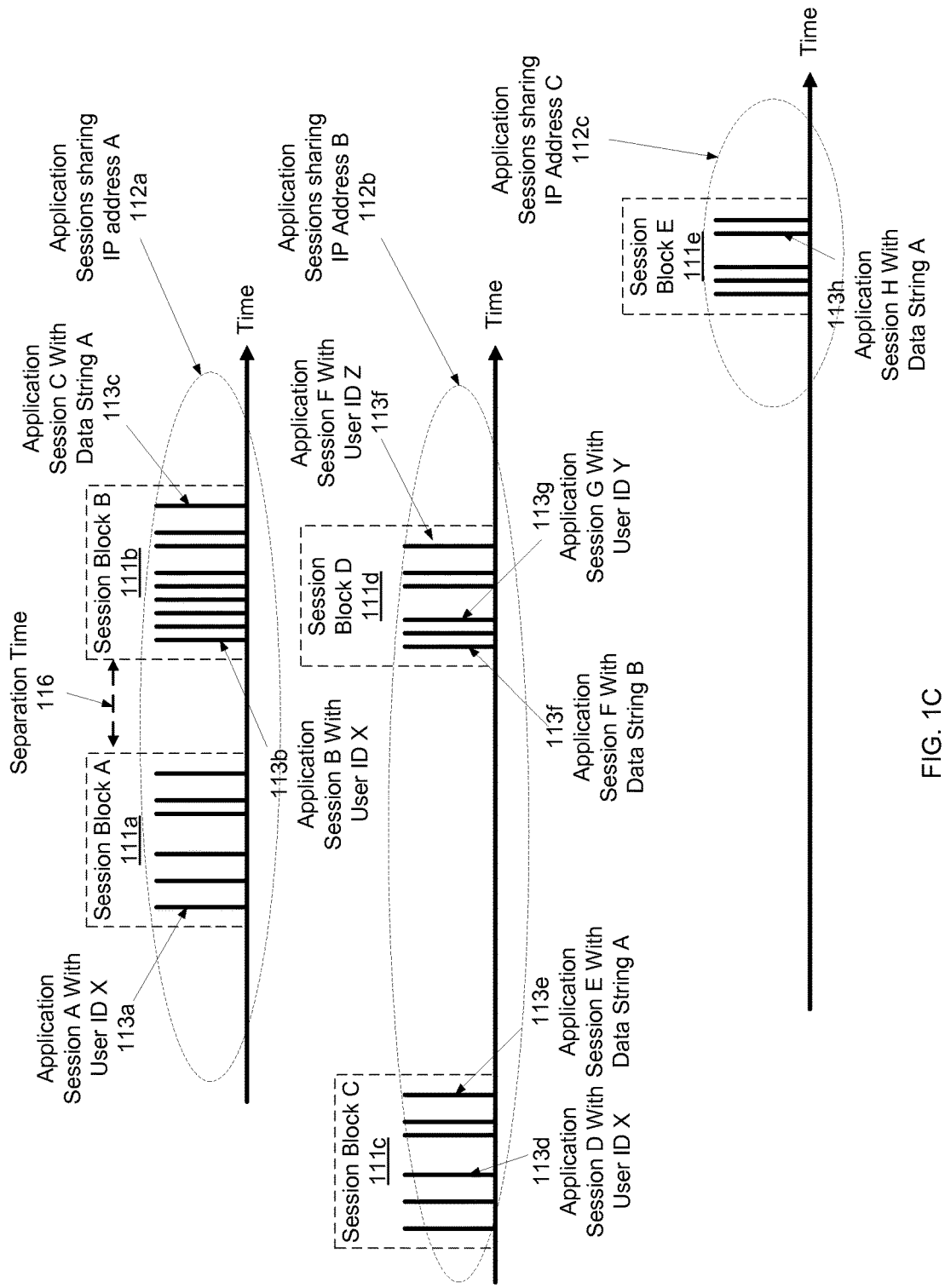
FIG. 1C shows a schematic block diagram according to aspects of the invention.

FIG. 1C shows a schematic diagram of session blocks in accordance with one or more embodiments of the invention. Those skilled in the art, having the benefit of this detailed description, will appreciate the components shown in FIG. 1C may differ among embodiments of the invention, and that one or more of the components may be optional. Although specific numbers of components are shown in FIG. 1C, different number of each component may be included. In one or more embodiments of the invention, one or more of the components shown in FIG. 1C may be omitted, repeated, supplemented, and/or otherwise modified from that shown in FIG. 1C. Accordingly, the specific arrangement of components shown in FIG. 1C should not be construed as limiting the scope of the invention.

Generally, the application sessions containing user identifiers (e.g., OSN user identifier or email address) cover only a small fraction (about 2.3% in an example dataset containing 3 hours worth of a cellular data network traffic) of all application sessions. FIG. 1C illustrates how these application sessions containing user identifiers are used as anchors to further expand their coverage for traffic attribution. Because of the dynamic IP address assignment commonly used by cellular data service providers, each mobile device is assigned with an IP address for a time duration when the device is continually active. Hence traffic activities occurring on the same IP address within a short period of time are likely generated by the same mobile device. Further, a majority of traffic generated by various applications and browsers on mobile devices are HTTP-based; the HTTP header fields (e.g., URL, cookie) often contain certain <attribute-value> strings (also referred to as key-value strings) to thread together stateless HTTP request/reply messages and keep track of the webpages users visited, their devices, or users themselves. When appropriately culled from the HTTP header fields, some of these strings, in conjunction with OSN identifiers, may be used to help attribute (especially non-OSN) HTTP traffic to users. Such strings are referred to as traffic markers.

FIG. 1C shows three groups of sessions (i.e., application sessions) along concurrent time lines; namely, sessions sharing IP address A (112a), sessions sharing IP address B (112b), and sessions sharing IP address C (112c), where each vertical bar denotes a session. For example, IP address A, B, and C may be source IP addresses assigned to user mobile devices and found in flows from these mobile devices. Generally throughout this disclosure, in particular in the description in reference to FIG. 1 B, the term "IP address" refers to mobile network service provider assigned IP address. In one or more embodiments, the sessions are grouped into distinct blocks using the following heuristic: two consecutive sessions belong to the same block if and only if they share the same dynamically assigned IP address and the idle period (i.e., the ending time of the previous session to the starting time of the next session) between them is less than delta seconds, where delta is a parameter depending on the dynamic IP assignment scheme used by the cellular data service provider. In other words, any two session blocks (e.g., session block A (111a) and session block B (111b)) on the same IP address (e.g., IP address A) are separated from each other by an idle period (e.g., separation time (116)) longer than delta seconds. For an example cellular data service provider, delta is set as 60 seconds based on the analysis of the idle period distribution in this specific network. In this example network, an IP address stays with the registered device as long as the device generates sessions at a rate greater than or equal to one session every 60 seconds. Therefore, if a device is not idle for more than 60 seconds, the device's assigned IP address will not change. Conversely, if the device is idle for more than 60 seconds, the device's assigned IP address will change. In the example shown in FIG. 1C, the session blocks A through E (111a-111e) may be part of the session blocks (121) shown in FIG. 1B. In particular, the session block A (111a), session block B (111b), and session block C (111c), although on two separate IP addresses, are attributed to the same user because they all contain the user identifier (ID) X.

In the aforementioned example dataset, 12,495,482 sessions are segmented into 99,234 session blocks after applying this heuristic.

Several factors may complicate the above simple heuristic, which may cause it to generate blocks (i.e., session blocks) which may not belong to a single user. One factor is the presence of WiFi devices in the data. Another is phone tethering which allows additional devices (e.g., a laptop or a tablet computer equipped only with WiFi) to access the Internet via a tethered mobile device. In addition, a phone may be shared by more than one user within a short period of time, or a user may have multiple OSN accounts. To address these issues, two filtering methods are used to identify blocks that likely belong to more than one user (referred to as hotspot blocks). The first method exploits the heterogeneity of the TTL (time-to-live) value contained in the (layer-3) IP datagram headers. Various common operating systems (OSes) set different initial TTL values. For example, several OSes uses TTL=64, while others set it to 128). In the example dataset, 1,554 blocks out of 99,234 blocks contain IP datagrams with more than one TTL value and are identified as hotspot blocks, which are discarded before further analysis.

The second method directly employs OSN identifiers and traffic markers to identify blocks that belong to more than one user. Any session block containing two distinct user identifiers of the same OSN are identified as multi-user block, which are also discarded before further analysis. For example, application session G with user ID Y and application session F with user ID Z co-occur in the session block D (111d), which is identified as multi-user block and discarded. In the example dataset, 563 blocks are found to contain conflicting OSN identifiers.

In order to identify and attribute other session blocks containing no user identifiers (e.g., OSN user identifier or email address) but are likely to be generated by the same users, the cookies and other key-value strings in the HTTP headers, referred to as traffic markers, are used. As noted above, these traffic markers are generated and used by various web services to thread together stateless HTTP request/reply messages and keep track of the webpages users visited, user devices, or users themselves. Generally, the existences, formats and meanings of the traffic markers are mostly site-specific. Further, there are a huge variety of them, many of which are dynamically generated. For instance, for a cookie used to track pages visited within a website, its value changes from page to page and are not suitable as a traffic marker to attribute session blocks to users. Instead, those that are longer-lasting (e.g., used in tracking users or their devices) are more suitable as traffic markers to attribute session blocks to users.

Let $U=\{u_i\}$ be a set of users discovered in the data, where each user $u_i$ is defined by a set of user identifiers (e.g., OSN identifiers or email addresses) he/she possesses. (For notational clarity, an OSN user and its identifiers are treated equivalently.) Let $M=\{m_l\}$ be a set of potential candidate traffic markers, where each marker $m_l$ is typically expressed in the form of key-value pairs, such as $(k_l, v_l)$. Two (potential) traffic markers $m_h=(k_h, v_h)$ and $m_l=(k_l, v_l)$ are of the same type if $k_h=k_l$ but $v_h$ does not equal $v_l$. Let T denotes the duration of a (significantly long) observation period, e.g., T=3 hours when using the example dataset. Given a pair of $(u_i, m_l)$, $P(u_i, m_l)$ denotes the probability that user $u_i$ and marker $m_l$ co-occur within a session block. For example, application session B with user ID X (113b) and application session C with data string A (113c) co-occur within the session block B (111b), application session D with user ID X (113d) and application session E with data string A (113e) co-occur within the session block C (111c).

In one or more embodiments, $P(u_i, m_l)$ is computed as the total duration of the blocks that contain both $u_i$ and $m_l$ divided by the total duration of all blocks containing any user in U. In one or more embodiments, a uniqueness measure is defined as below. Given a pair $(u_i, m_l)$ where $P(u_i, m_l)>0$, the uniqueness of $(u_i, m_l)$, denoted by $\psi(u_i, m_l)$, is defined as $$\Psi(u_i,m_l):=1-\Sigma_{j\neq i:u_j\in U}P(u_j,m_l)$$

From the above definition, if $\psi(u_i, m_l)=1$, then the candidate traffic marker $m_l$ is uniquely associated with the user $u_i$. Otherwise, the same marker has also been observed to be associated with another user, signifying that it is not a useful traffic marker. Hence using the uniqueness measure, all key-value strings in the HTTP header fields that are not useful candidates for traffic markers are discarded.

Among all candidate traffic markers uniquely associated with each user, many of them may be ephemeral, i.e., change from one webpage to another or from one user session to another). This leads to defining a persistence measure as below. Given a pair $(u_i, m_l)$ where $P(u_i, m_l)>0$, and $\psi(u_i, m_l)=1$, the persistence of $(u_i, m_l)$, denoted by $\Pi(u_i, m_l)$, is defined as $$\Pi(u_i,m_l):=1-\Sigma_{h\neq l:m_h\in M}P(u_i,m_h)/P(u_i)$$

$$P(u_i):=\Sigma_{m_l\in M}P(u_i,m_l)$$

From the above definition, if $\Pi(u_i, m_l)=1$ or approximately 1 (e.g., 0.9), then the candidate marker co-occurs with $u_i$ almost all the time throughout the observation period. Hence $m_l$ serves as a useful candidate traffic marker, and thus may be used to attribute other session blocks which contain $m_l$ but not $u_i$ to user $u_i$. In addition, using this persistence property, most session-specific or page-specific cookies, whose values change from one webpage to another or from one user session to another, are discarded as their persistence values are generally very low. For example as shown schematically in FIG. 1C, data string A co-occurs with user ID X in a unique and persistent manner (e.g., in session block B (111b), session block C (111c), etc.) and is identified as a useful traffic marker for the user ID X. Accordingly, the session block E (111e), that contains the data string A but not the user ID X, is attributed to the user identified by the user ID X as described above regardless if it is on the same IP address with any other session block already attributed to the user. In contrast, data string B and user ID Y only co-occur in the session block D (111d) and fail to meet the threshold (e.g., 1) required for the uniqueness measure or the threshold (e.g., higher than 0.9) required for the persistence measure, therefore the data string B is not identified as a useful traffic marker for the user ID Y. In the example dataset, 625 types of traffic markers are identified. TABLE 6 lists 10 types that are most commonly seen in the data. Most of these markers are located inside the cookie field of the HTTP header listed in the "string to match" column of TABLE 6. As an exception, the "admob.com" identifier, is found in a specific string "X-Admob-ISU" in the packet payloads.

TABLE 6

| Traffic marker domain | Category | Where to find | String to match |
| --- | --- | --- | --- |
| admob.com | Ad | HTTP:X-Admob-ISU | X-Admob-ISU |
| atdmt.com, msn.com, bing.com | Ad | HTTP:cookie | muid |

TABLE 6-continued

| Traffic marker domain | Category | Where to find | String to match |
|---|---|---|---|
| doubleclick.net | Ad | HTTP:cookie | id |
| mydas.mobi | Ad | HTTP:cookie | mac-id |
| google.com. | Sid | HTTP:cookie | sid |
| craigslist.org | Uid | HTTP:cookie | cl_b |
| yahoo.com | Uid | HTTP:cookie | c |
| scorecardresearch.com | Tid | HTTP:cookie | uid |
| quantserve.com | Tid | HTTP:cookie | mc |
| google-analytics.com | Tid | HTTP:cookie | utmcc |

These 625 example traffic markers are grouped into four categories in TABLE 6 based on the purpose they serve, namely, advertisement (Ad), personalized logins (Uid), tracking users (Tid), and tracking service sessions(Sid).

Figure 2A:
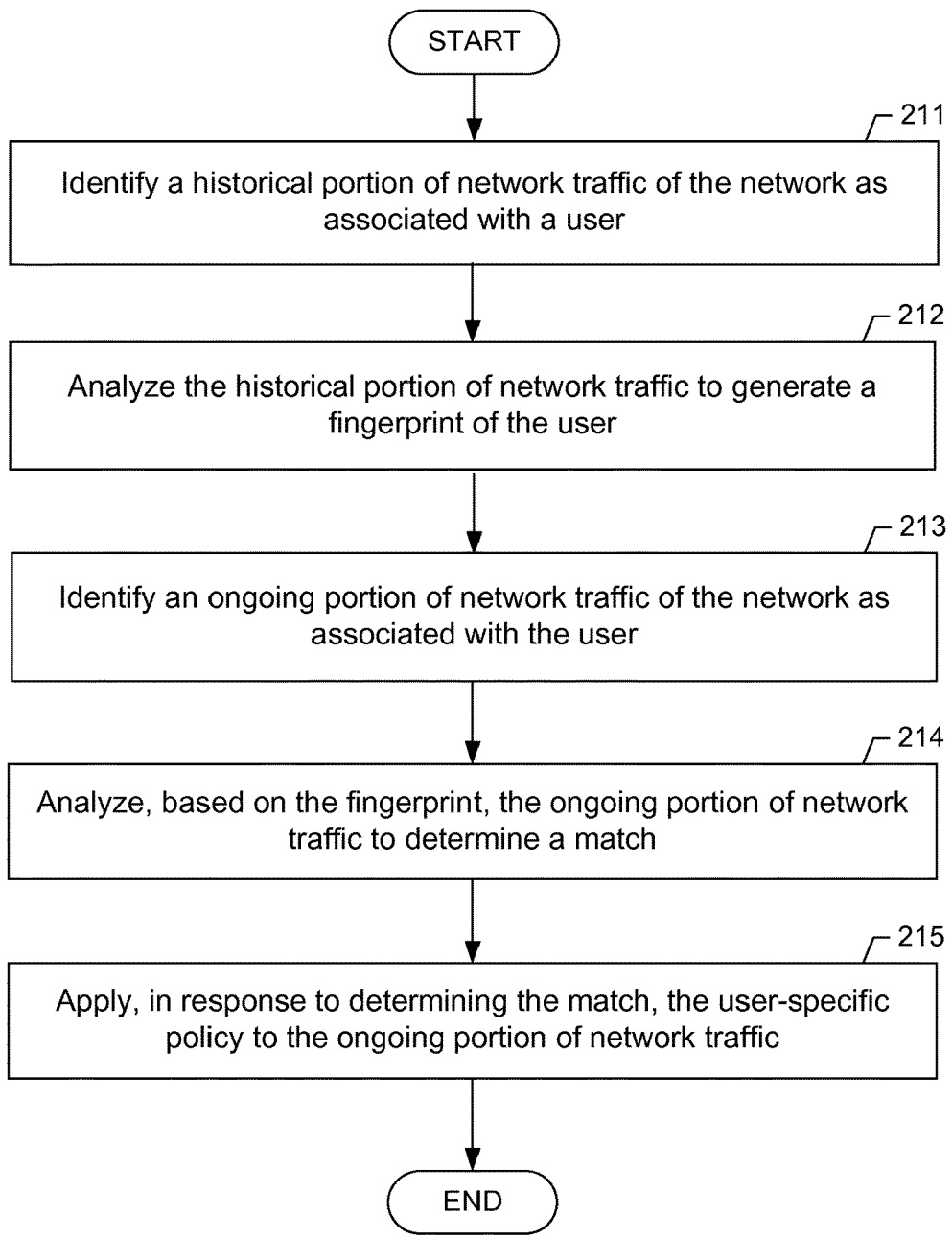
FIG. 2A shows a flowchart of a method according to aspects of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments of the invention, the method depicted in FIG. 2A may be practiced using system A (100a) described with respect to FIG. 1A above.

Initially in Step 211, a historical portion of network traffic of the network is identified as associated with a user. In one or more embodiments, the historical portion of network traffic of the network includes completed flows used as training data to generate fingerprints of the user. In one or more embodiments, these completed flows may be identified as being generated by the user using the method described in reference to FIG. 2B below.

In Step 212, the historical portion of network traffic is analyzed to generate a fingerprint of the user. Specifically, the fingerprint represents characteristics of user activity in the network. In one or more embodiments, statistical features are extracted from the historical portion of the network traffic and analyzed to determine a uniqueness measure and a persistence measure. Specifically, the uniqueness measure and the persistence measure represents the degree of uniqueness and the degree of persistence for each statistical feature in identifying network activity of the user. In one or more embodiments, the statistical features includes a user identifier, a domain name of an accessed server, a universal resource locator (URL) of an accessed web service, a network application identifier, a geo-location report, a point-of-interest (POI) name, and/or an online social network (OSN) message.

In Step 213, an ongoing portion of network traffic of the network is identified as associated with the user. In one or more embodiments, the ongoing portion of network traffic of the network includes completed flows as well as currently ongoing flows to be attributed to any user. In one or more embodiments, these completed flows as well as currently ongoing flows may be identified as being generated by a single user using the method described in reference to FIG. 2B below. In one or more embodiments, identifying the historical portion and the ongoing portion of network traffic as associated with the user is based on an IP address assigned to a device of the user, a time window associated with the IP address assigned to the device of the user, a dynamic host configuration protocol (DHCP) message, and/or a remote authentication dial in user service (RADIUS) identifier.

In Step 214, based on the fingerprint, the ongoing portion of network traffic is analyzed to determine a match. In particular, the match is determined at a time point within the ongoing portion of network traffic. In other words, the ongoing portion of network traffic includes ongoing flows that continues subsequent to the time point when the match is determined.

In Step 215, in response to determining the match, the user-specific policy is applied to the ongoing portion of network traffic subsequent to the time point. In one or more embodiments, the user-specific policy include a network resource access permission policy and/or a network bandwidth allocation policy.

Figure 2B:
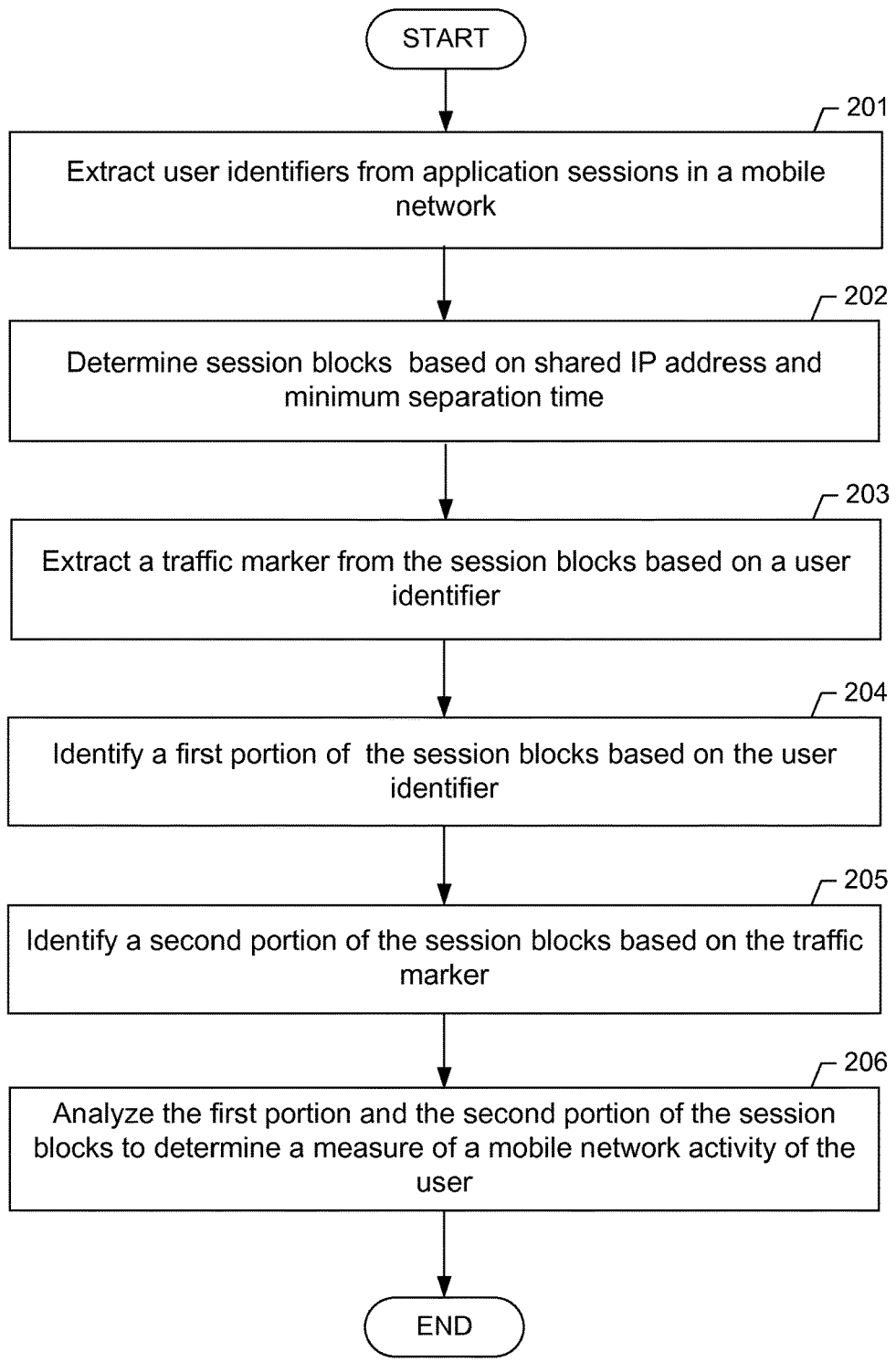
FIG. 2B shows a flowchart of a method according to aspects of the invention.

FIG. 2B depicts a flowchart of a method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments of the invention, the method depicted in FIG. 2B may be practiced using system B (100b) described with respect to FIG. 1B above. In particular, the method depicted in FIG. 2B may be used in Step 211 and Step 213 depicted in FIG. 2A above for identifying a portion of the network traffic as associated with a user.

Initially in Step 201, user identifiers are extracted from application sessions based on a pre-determined criterion. In one or more embodiments, the user identifier is an online social network (OSN) user identifier, and the pre-determined criterion includes an OSN-specific parsing algorithm applied to the application sessions. In one or more embodiments, the user identifier is an email address, and the pre-determined criterion includes a layer-7-application-specific parsing algorithm applied to the application sessions. In one or more embodiments, the user identifiers are extracted using the user session block identifier (103) of FIG. 1B as described above. For example as shown in FIG. 1C, the user identifiers include user ID X, user ID Y, and user ID Z.

In Step 202, session blocks are determined by analyzing the application sessions based on shared IP address and minimum separate time. Specifically, each session block includes application sessions sharing an IP address and is defined based on a minimum separation time with any other session block sharing the IP address. In one or more embodiments, the session blocks are determined using the session block generator (102) of FIG. 1B as described above. For example as shown in FIG. 1C, the session blocks includes session block A (111a) through session block E (111e).

In Step 203, a traffic marker is extracted from the session blocks based on a user identifier. In one or more embodiments, a measure of co-occurrence in the session blocks is determined between the user identifier and a data string, where the data string is identified as the traffic marker in response to the measure meeting a pre-determined threshold. In one or more embodiments, the measure includes one or both of a uniqueness measure and a persistence measure. In one or more embodiments, the traffic marker is extracted using the user session block identifier (103) of FIG. 1B as described above. For example as shown in FIG. 1C, the data string A is identified as a traffic marker based on the user ID X.

In Step 204, a first portion of the session blocks is identified based on the user identifier. In particular, the first portion of the session blocks is associated with mobile network activities of a user identified by the user identifier. In one or more embodiments, the first portion of the session blocks is identified using the user session block identifier (103) of FIG. 1B as described above. For example as shown in FIG. 1C, the first portion includes the session block A (111a), session block B (111b), session block C (111c), etc.

In Step 205, a second portion of the session blocks is identified based on the traffic marker. In particular, the second portion of the session blocks is also associated with mobile network activities of the user identified by the user identifier. In one or more embodiments, the second portion of the session blocks is identified using the user session block identifier (103) of FIG. 1B as described above. Further, any session block that contains two or more user identifier or two or more time-to-live values are eliminated from the first portion and the second portion of the plurality of the session blocks. For example as shown in FIG. 1C, the second portion includes the session block E (111e), etc. with the session block D (111d) eliminated as it contains two user identifiers ID Y and ID Z.

In Step 206, the first portion and the second portion of the session blocks are analyzed to determine a measure of a mobile network activity of the user. In one or more embodiments, the first portion and the second portion of the session blocks are determined as generated by a single user and are collectively referred to as a flow group of the user. In one or more embodiments, domain name service (DNS) server names from the first portion and the second portion of the session blocks are analyzed to determine the measure of the mobile network activity of the user. Further, user profiles are extracted from online social networks based on user identifiers of multiple users to generate a measure of privacy leak on the public domain of the Internet in conjunction with mobile network activities of these users. In one or more embodiments, the mobile network activity measure of each user and privacy leakage for multiple users in the mobile network are determined using the user activity analyzer (104) of FIG. 1B as described above. For example as shown in FIG. 1C, the first portion includes all sessions contained in the session block A (111a), session block B (111b), session block C (111c), session block E (111e), etc. are attributed to the same user and are analyzed to extract all DNS server names for profiling the user activity in the mobile network.

In summary, with the set of traffic markers $M(u_i)$ of user $u_i$, the traffic attribution may be done in a straightforward fashion: a block is attributed to user $u_i$ if and only if it contains either an user identifier (e.g., an OSN identifier or email address) of user $u_i$ or a traffic marker $m_j$ in $M(u_u)$. The first two rows of TABLE 7 summarize and compare the results of Step 206.

age session coverage increase from 7 to 176 and their time coverage increase from 8.3 to 62.3 minutes. Considering the total number of sessions, Tessellation puts a half (49.8%) of all traffic under the known user category. Additional details of analyzing session blocks attributed to a user and determining one or more measures of the user's mobile network activity are described in an example in FIG. 3A below. In the description of the example in FIG. 3A, measures of the user's mobile network activity are collectively referred to as "user mosaic," and determining these measures is referred to as "tessellating the user mosaic."

Figures 3A, 3B:
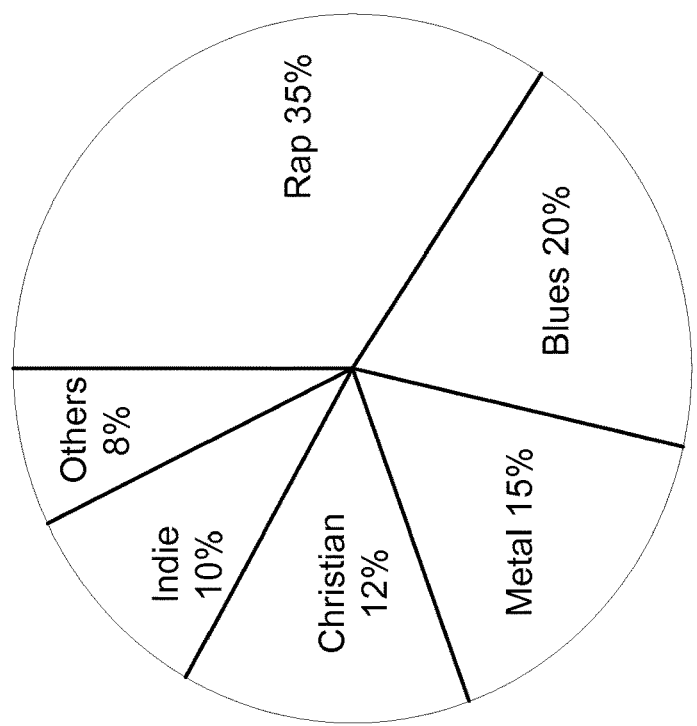
FIGS. 3A-3B show various examples according to aspects of the invention.

FIGS. 3A and 3B show application example results in accordance with embodiments of the invention.

FIG. 3A shows a user mosaic constructed using information mined from the session blocks attributed to a user. The user activities are categorized into twelve categories corresponding to the twelve boxes in the user mosaic. For example, these twelve categories may be identified based on top 12 most frequently occurring DNS server names found in the session blocks attributed to the user. In one or more embodiments, each box is highlighted using color or pattern to represent amount of information mined from the session blocks attributed to the user. In one or more embodiments, each box is highlighted using color or pattern to represent a measure of user activity as determined from the session blocks attributed to the user.

To illustrate the process of tessellating the user mosaic, the example of FIG. 3A may be related to a specific user aliased as "Alice"

In building Alice's mosaic, information is mined from the following three main sources: (i) user activity analysis as described earlier, which not only reveals the types of activities Alice engages in, but also how much time she typically spends on each activity, and so forth; (ii) user-specific, static or dynamic, information in various "digital footprints" left by Alice during her online activities; and (iii) other publicly available pieces of information about Alice that may be crawled from the global Internet (e.g., those voluntarily disclosed in Alice's public OSN profiles).

In general, the "publicly available" information extracted from crawling the OSN sites or searching the global Internet is at a coarser granularity and largely static. For example, Alice may disclose in her public OSN profile her resident city and state, affiliation, education history, and her interests. But typically she will not disclose her precise home or work address, where she is currently located, whom she has just messaged, what songs she listened in the past hour, and other pieces of information that is dynamic in nature. In the case

TABLE 7

| Tessellation-Steps | Session Coverage per User (avg/ 90-percentile) | Time Coverage per User (avg/ 90-percentile) | Total Session Coverage | Uniqueness Ψ |
|---|---|---|---|---|
| OSN ID extraction | 14/7 | 11.8/8.3 [min] | 2.4% (297, 358) | 1 |
| Traffic attribution | 326/176 | 65.4/62.3 [min] | 49.8% (6,217, 036) | 1 |
| Activity analysis | 586/530 | 82.3/81.0 [min] | 78.6% (9,831, 924) | >0.98 |

At the beginning of traffic attribution (referred to in TABLE 3 as "Tessellation"), an OSN user identifier only may attribute an average of 14 sessions that last for a total duration of 11.8 minutes, as shown in the first row of TABLE 3. Adding traffic markers, an average of 326 sessions may be attributed to a user, lasting a total of 65.4 minutes, as shown in the second row of TABLE 3. For bottom 90% of the users (i.e., users with their OSN identities appearing less frequently), a more dramatic improvement is seen: their averof Alice, her first and last name, the city she lives in (City X, State Y), the city she is from (City Z, State Y), her favorite TV shows (Sex and the city, etc.), and music artists (Bob Marley, etc.) are discovered by crawling her online social network profile page.

Mining and gleaning information in the digital footprints left by Alice, on the other hand, may reveal far more about her. For instance, through the activity analysis using the 3 h-Dataset, it is discovered that Alice spent 72% of her time (1.93 hrs out of 2.66 hrs) in shopping goods in three different e-commerce sites. In the majority of her remaining time (0.6 hrs), she moved back and forth between a OSN site and a online game site. In the mean time, her computer updated its OS and virus signature in the background.

FIG. 3B shows a pie chart of music listening preferences tallied over multiple users based on amount of time each user spent accessing music service providers (e.g., identified based on DNS server names), as determined from the session blocks attributed to the respective user.

Although specific formats or structures are used as examples in the foregoing description regarding the flows, the captured payloads, the signature terms, filtering layer/qualification loop structures, etc., one skilled in the art, with the benefit of this disclosure, will recognize that other formats or structures may also be used in the system and methods described without deviating from the spirit of the invention.

Figure 4:
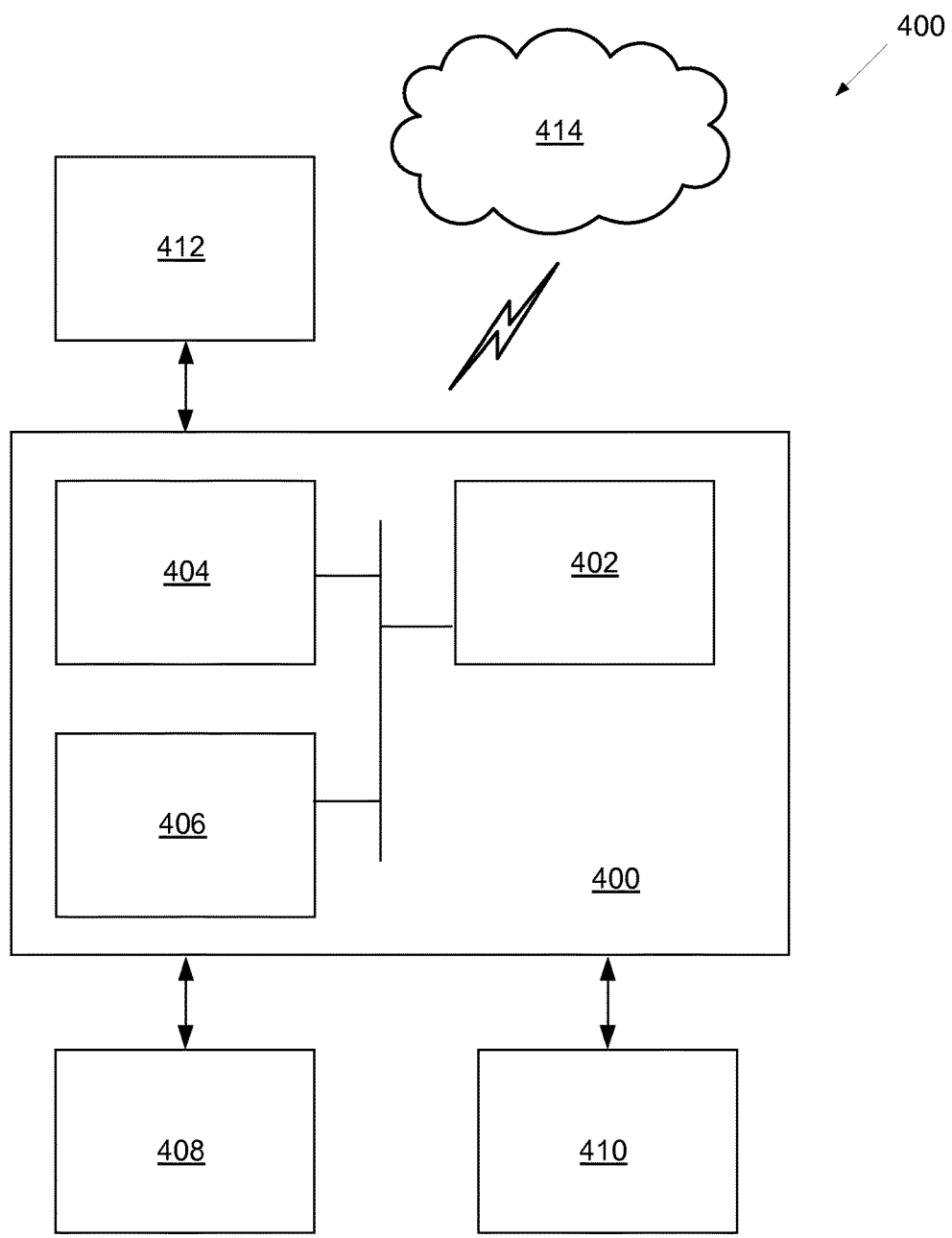
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (414) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for applying a user-specific policy in a network, comprising:
    identifying a historical portion of network traffic of the network as associated with a user;
    analyzing, by a computer processor, the historical portion of network traffic to generate a fingerprint of the user, wherein the fingerprint represents characteristics of user activity in the network, wherein the fingerprint is generated by extracting Domain Name System (DNS) names associated with various sites visited by the user, wherein generating a fingerprint includes extracting statistical features that are assessed by two factors: 1) uniqueness and 2) persistence, each factor being a quantifiable value determined algorithmically, wherein only statistical features with assessed uniqueness and persistence values above predetermined thresholds are stored as fingerprints of users and statistical features with assessed uniqueness and persistence values below predetermined thresholds are stored as candidate fingerprints;
    identifying an ongoing portion of network traffic of the network as associated with a single user;
    analyzing, by the computer processor and based on the fingerprint, the ongoing portion of network traffic to determine a match, wherein the match is determined at a time point within the ongoing portion of network traffic; and
    applying, in response to determining the match, the user-specific policy to the ongoing portion of network traffic subsequent to the time point.

2. The method of claim 1, wherein the user-specific policy comprises at least one selected from a group consisting of a network resource access permission policy and a network bandwidth allocation policy.

3. The method of claim 1, further comprising:
    extracting a plurality of features from the historical portion of the network traffic,
    wherein generating the fingerprint of the user comprises analyzing the plurality of features to determine a uniqueness measure and a persistence measure of network activity of the user, and
    wherein the plurality of features comprises at least one selected from a group consisting of a user identifier, a domain name of an accessed server, a universal resource locator (URL) of an accessed web service, a network application identifier, a geo-location report, a point-of-interest (POI) name, and an online social network (OSN) message.

4. The method of claim 3,
    wherein the plurality of features comprises statistical features, and
    wherein the uniqueness measure and the persistence measure of network activity comprises a statistical uniqueness measure and a statistical persistence measure of network activity of the user.

5. The method of claim 1, further comprising:
    contemporaneous to analyzing the ongoing portion of network traffic to determine the match, identifying a most current source Internet Protocol (IP) address assigned to a device most recently used by the user to contribute to the ongoing portion of network traffic, wherein identifying the ongoing portion of network traffic as associated with the user subsequent to the time point is based on the most current source IP address.

6. The method of claim 1, wherein identifying the historical portion and the ongoing portion of network traffic as associated with the user is based on at least one selected from a group consisting of an IP address assigned to a device of the user, a time window associated with the IP address assigned to the device of the user, a dynamic host configuration protocol (DHCP) message, a remote authentication dial in user service (RADIUS) message; and a RADIUS identifier.

7. The method of claim 1, wherein identifying the historical portion and the ongoing portion of network traffic as associated with the user comprises:
   identifying, from the network, a plurality of application sessions;
   extracting a plurality of user identifiers from the plurality of application sessions based on a pre-determined criterion;
   analyzing the plurality of application sessions to determine a plurality of session blocks, wherein each session block comprises a plurality of application sessions sharing an originating IP address and is defined based on a minimum separation time between said each session block and any other session block sharing the originating IP address;
   extracting a traffic marker from the plurality of session blocks based on a user identifier of the plurality of user identifiers, wherein the user is identified by the user identifier;
   identifying a first portion of the plurality of the session blocks based on the user identifier, wherein the first portion of the plurality of the session blocks is associated with first network activities of the user; and
   identifying a second portion of the plurality of the session blocks based on the traffic marker, wherein the second portion of the plurality of the session blocks is associated with second network activities of the user,
   wherein the historical portion and the ongoing portion of network traffic comprises the first portion and the second portion of the plurality of the session blocks.

8. The method of claim 7,
   wherein the user identifier comprises at least one selected from a group consisting of an online social network (OSN) user identifier and an email address,
   wherein the pre-determined criterion comprises at least one selected from a group consisting of an OSN-specific parsing algorithm and a layer-7-application-specific parsing algorithm applied to the plurality of application sessions,
   wherein extracting the traffic marker from the plurality of session blocks based on the user identifier comprises:
      determining a measure of co-occurrence in the plurality of session blocks between the user identifier and a data string; and
      identifying the data string as the traffic marker in response to the measure meeting a pre-determined threshold.

9. A system for applying a user-specific policy in a network, comprising:
   a processor and memory;
   a user flow group generator comprising instructions stored in the memory, when executed on the processor having functionality to:
      identify each of a historical portion and an ongoing portion of network traffic of the network as associated with a single user;
   a user activity analyzer comprising instructions stored in the memory, when executed on the processor having functionality to:
      analyze the historical portion of network traffic to generate a fingerprint of the user, wherein the fingerprint represents characteristics of user activity in the network, wherein the fingerprint is generated by extracting Domain Name System (DNS) names associated with various sites visited by the user, wherein generating a fingerprint includes extracting statistical features that are assessed by two factors: 1) uniqueness and 2) persistence, each factor being a quantifiable value determined algorithmically, wherein only statistical features with assessed uniqueness and persistence values above predetermined thresholds are stored as fingerprints of users and statistical features with assessed uniqueness and persistence values below predetermined thresholds are stored as candidate fingerprints; and
      analyze, based on the fingerprint, the ongoing portion of network traffic to determine a match, wherein the match is determined at a time point within the ongoing portion of network traffic; and
   a network traffic manager comprising instructions stored in the memory, when executed on the processor having functionality to:
      apply, in response to determining the match, the user-specific policy to the ongoing portion of network traffic subsequent to the time point.

10. The system of claim 9, wherein the user-specific policy comprises at least one selected from a group consisting of a network resource access permission policy and a network bandwidth allocation policy.

11. The system of claim 9, wherein the user activity analyzer further comprises instructions stored in the memory, when executed on the processor having functionality to:
   extract a plurality of features from the historical portion of the network traffic,
   wherein generating the fingerprint of the user comprises analyzing the plurality of features to determine a uniqueness measure and a persistence measure of network activity of the user, and
   wherein the plurality of features comprises at least one selected from a group consisting of a user identifier, a domain name of an accessed server, a universal resource locator (URL) of an accessed web service, a network application identifier, a geo-location report, a point-of-interest (POI) name, and an online social network (OSN) message.

12. The system of claim 11,
   wherein the plurality of features comprises statistical features, and
   wherein the uniqueness measure and the persistence measure of network activity comprises a statistical uniqueness measure and a statistical persistence measure of network activity of the user.

13. The system of claim 9, wherein the user activity analyzer further comprises instructions stored in the memory, when executed on the processor having functionality to:
   contemporaneous to analyzing the ongoing portion of network traffic to determine the match, identify a most current source Internet Protocol (IP) address assigned to a device most recently used by the user to contribute to the ongoing portion of network traffic,
wherein identifying the ongoing portion of network traffic as associated with the user subsequent to the time point is based on the most current source IP address.

14. The system of claim 9, wherein identifying the historical portion and the ongoing portion of network traffic as associated with the user is based on at least one selected from a group consisting of an IP address assigned to a device of the user, a time window associated with the IP address assigned to the device of the user, a dynamic host configuration protocol (DHCP) message, a remote authentication dial in user service (RADIUS) message, and a RADIUS identifier.

15. The system of claim 9, wherein identifying the historical portion and the ongoing portion of network traffic as associated with the user comprises:
identifying, from the network, a plurality of application sessions;
extracting a plurality of user identifiers from the plurality of application sessions based on a pre-determined criterion;
analyzing the plurality of application sessions to determine a plurality of session blocks, wherein each session block comprises a plurality of application sessions sharing an originating IP address and is defined based on a minimum separation time between said each session block with any other session block sharing the originating IP address;
extracting a traffic marker from the plurality of session blocks based on a user identifier of the plurality of user identifiers, wherein the user is identified by the user identifier;
identifying a first portion of the plurality of the session blocks based on the user identifier, wherein the first portion of the plurality of the session blocks is associated with first network activities of the user; and
identifying a second portion of the plurality of the session blocks based on the traffic marker, wherein the second portion of the plurality of the session blocks is associated with second network activities of the user,
wherein the historical portion and the ongoing portion of network traffic comprises the first portion and the second portion of the plurality of the session blocks.

16. The system of claim 15,
wherein the user identifier comprises at least one selected from a group consisting of an online social network (OSN) user identifier and an email address,
wherein the pre-determined criterion comprises at least one selected from a group consisting of an OSN-specific parsing algorithm and a layer-7-application-specific parsing algorithm applied to the plurality of application sessions,
wherein extracting the traffic marker from the plurality of session blocks based on the user identifier comprises:
determining a measure of co-occurrence in the plurality of session blocks between the user identifier and a data string; and
identifying the data string as the traffic marker in response to the measure meeting a pre-determined threshold.

17. A non-transitory computer readable medium embodying instructions for applying a user-specific policy in a network, the instructions when executed by a processor comprising functionality for:
identifying a historical portion of network traffic of the network as associated with a user;
analyzing the historical portion of network traffic to generate a fingerprint of the user, wherein the fingerprint represents characteristics of user activity in the network;
identifying an ongoing portion of network traffic of the network as associated with a single user;
analyzing, based on the fingerprint, the ongoing portion of network traffic to determine a match, wherein the match is determined at a time point within the ongoing portion of network traffic, wherein the fingerprint is generated by extracting Domain Name System (DNS) names associated with various sites visited by the user, wherein generating a fingerprint includes extracting statistical features that are assessed by two factors: 1) uniqueness and 2) persistence, each factor being a quantifiable value determined algorithmically, wherein only statistical features with assessed uniqueness and persistence values above predetermined thresholds are stored as fingerprints of users and statistical features with assessed uniqueness and persistence values below predetermined thresholds are stored as candidate fingerprints; and
applying, in response to determining the match, the user-specific policy to the ongoing portion of network traffic subsequent to the time point.

18. The non-transitory computer readable medium of claim 17, wherein the user-specific policy comprises at least one selected from a group consisting of a network resource access permission policy and a network bandwidth allocation policy.

19. The non-transitory computer readable medium of claim 17, further comprising:
extracting a plurality of features from the historical portion of the network traffic,
wherein generating the fingerprint of the user comprises analyzing the plurality of features to determine a uniqueness measure and a persistence measure of network activity of the user, and
wherein the plurality of features comprises at least one selected from a group consisting of a user identifier, a domain name of an accessed server, a universal resource locator (URL) of an accessed web service, a network application identifier, a geo-location report, a point-of-interest (POI) name, and an online social network (OSN) message.

20. The non-transitory computer readable medium of claim 17, further comprising:
contemporaneous to analyzing the ongoing portion of network traffic to determine the match, identifying a most current source Internet Protocol (IP) address assigned to a device most recently used by the user to contribute to the ongoing portion of network traffic,
wherein identifying the ongoing portion of network traffic as associated with the user subsequent to the time point is based on the most current source IP address.

* * * * *